A. B. HAZARD.
TESTING SYSTEM, PROCESS, AND MACHINE.
APPLICATION FILED JAN. 13, 1917.
1,341,463.
Patented May 25, 1920.
12 SHEETS—SHEET 4.
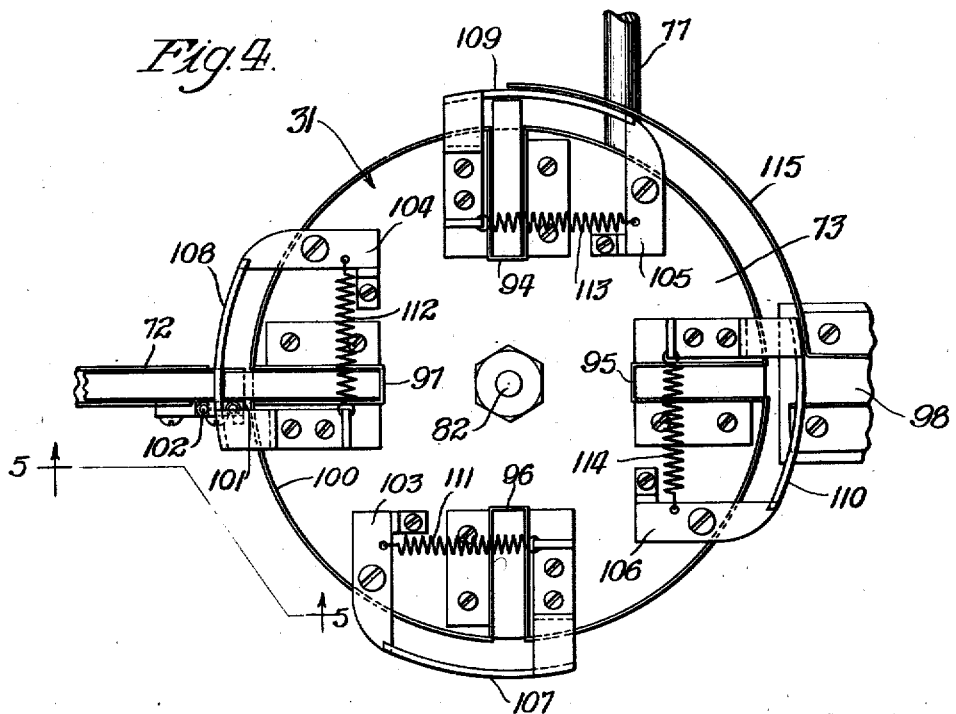
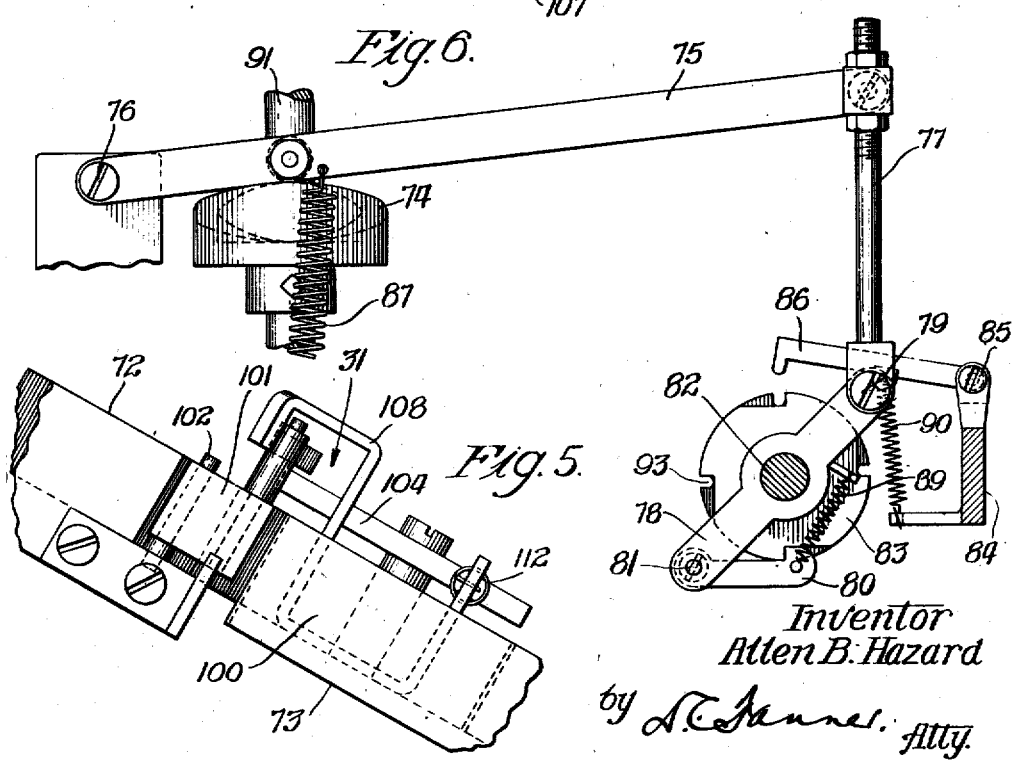
Inventor
Allen B. Hazard

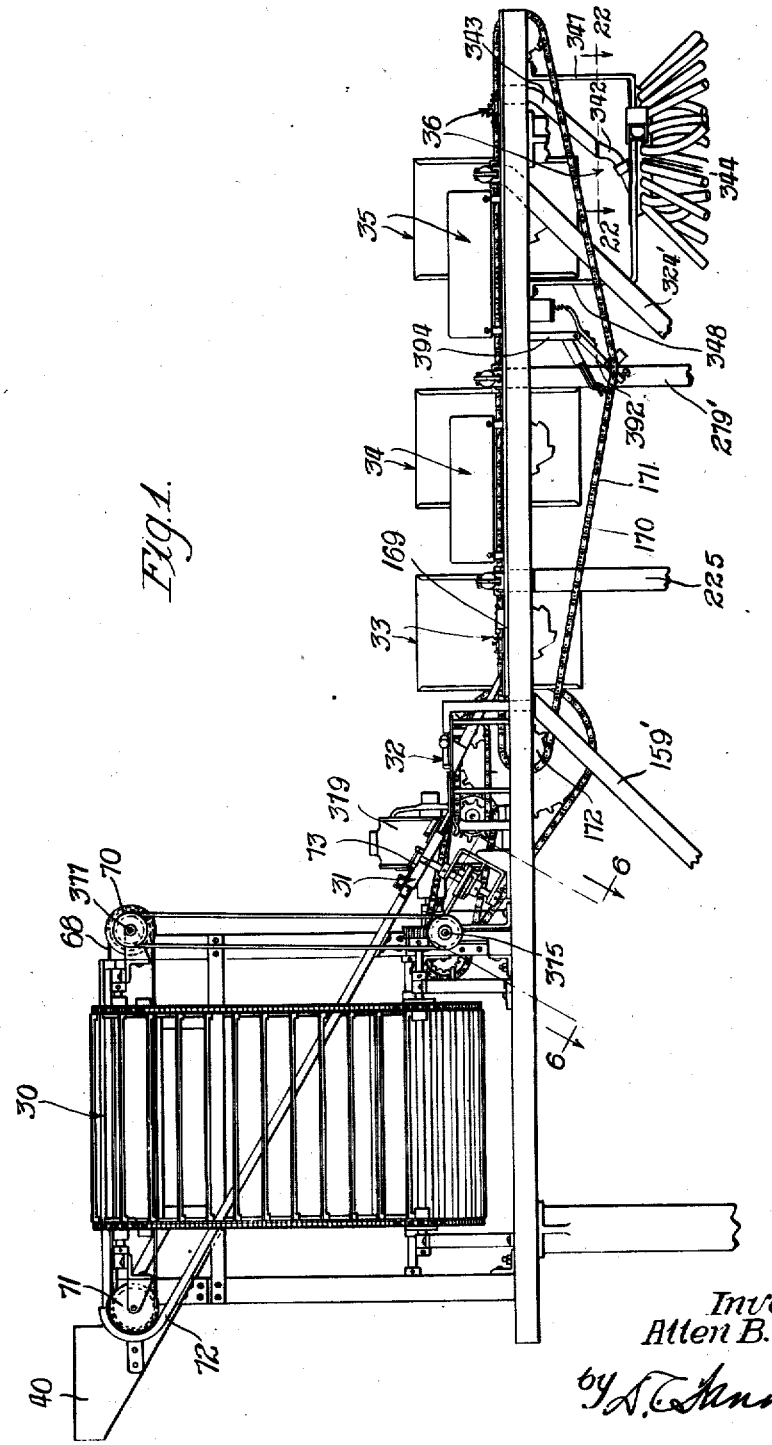

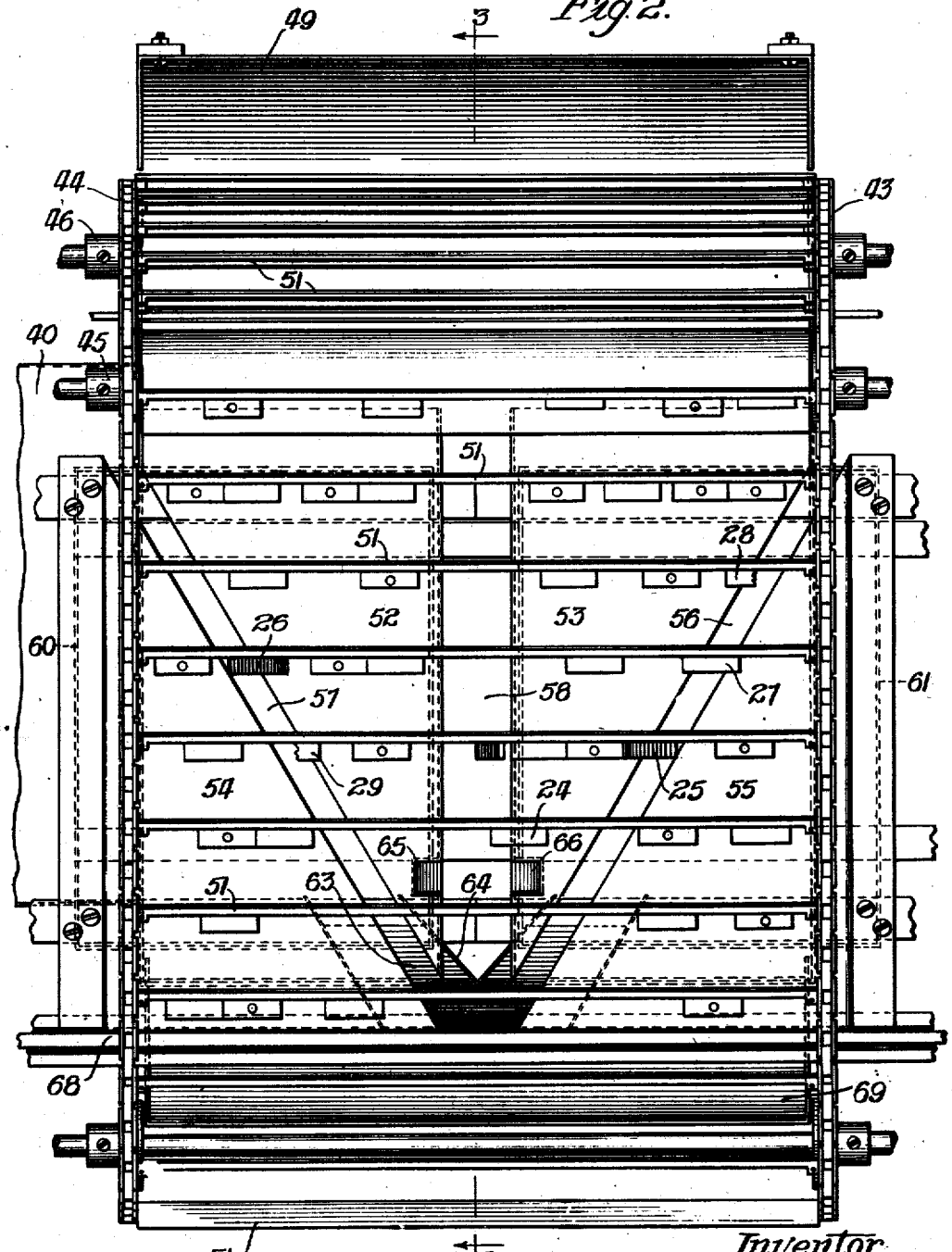

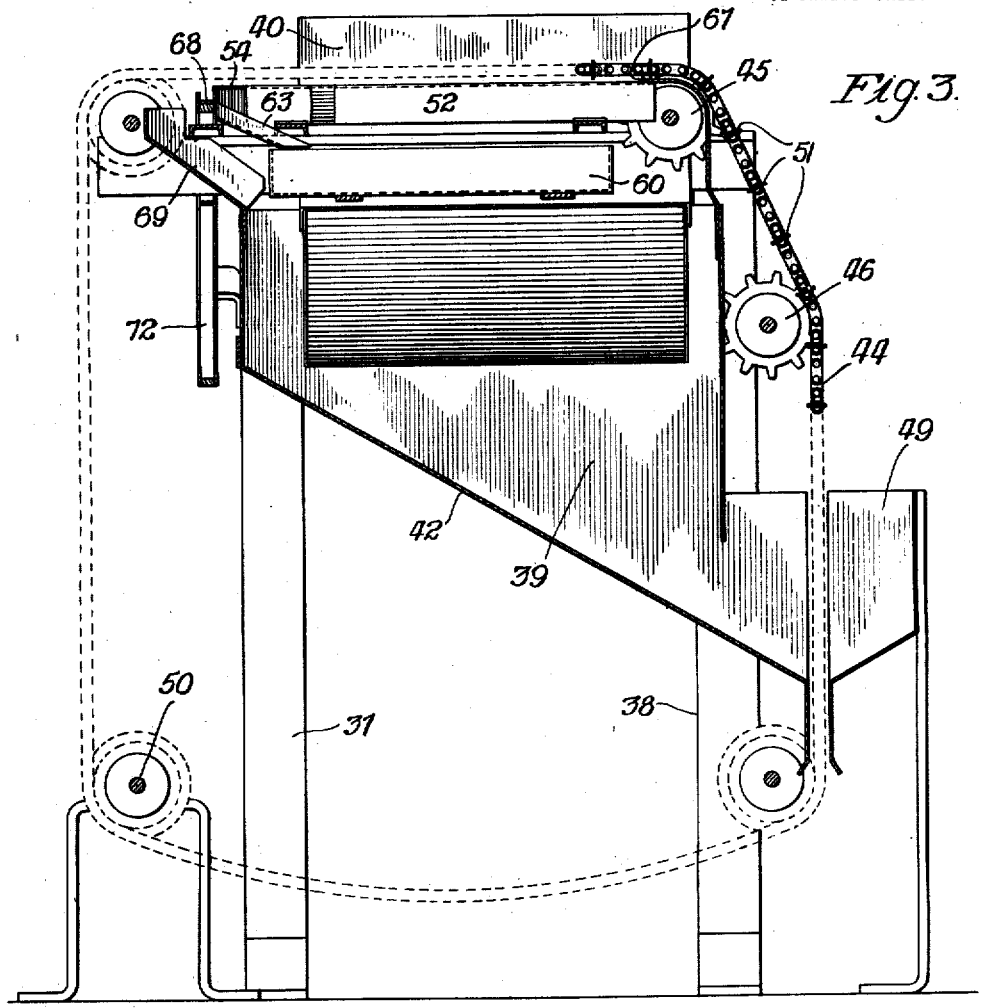

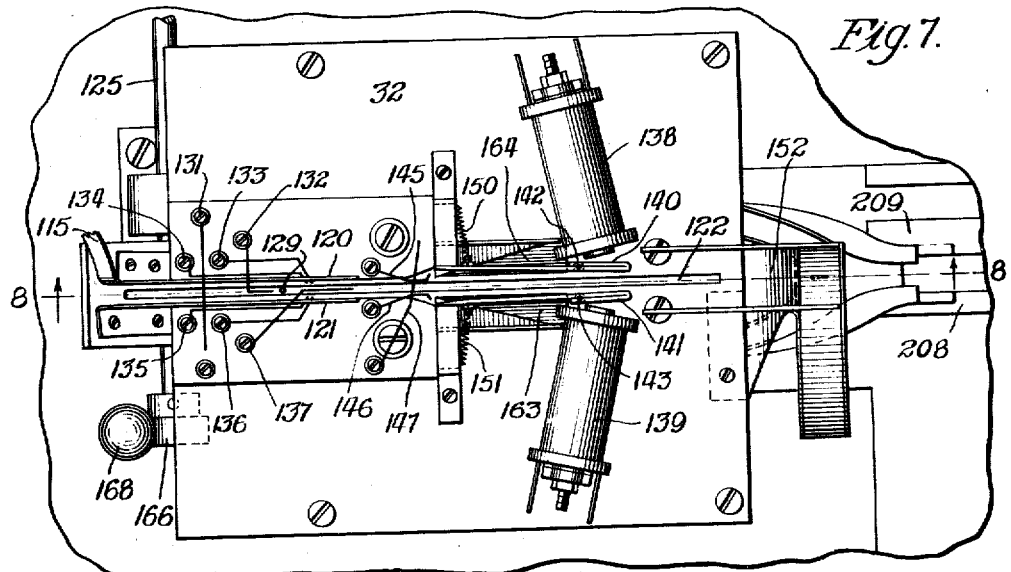
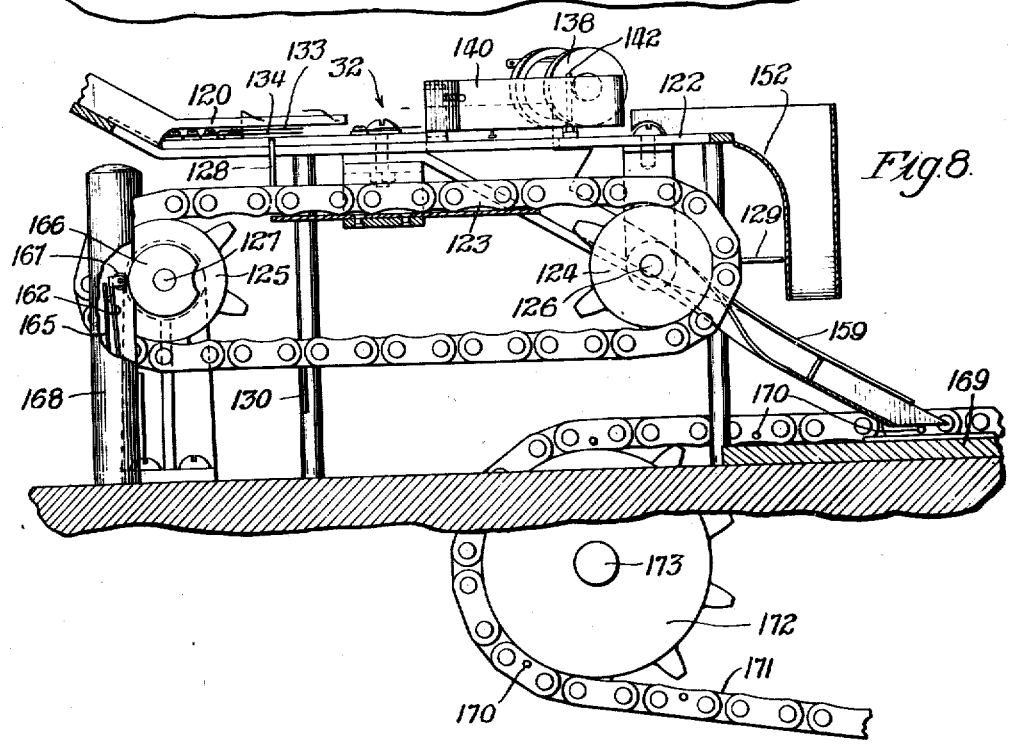

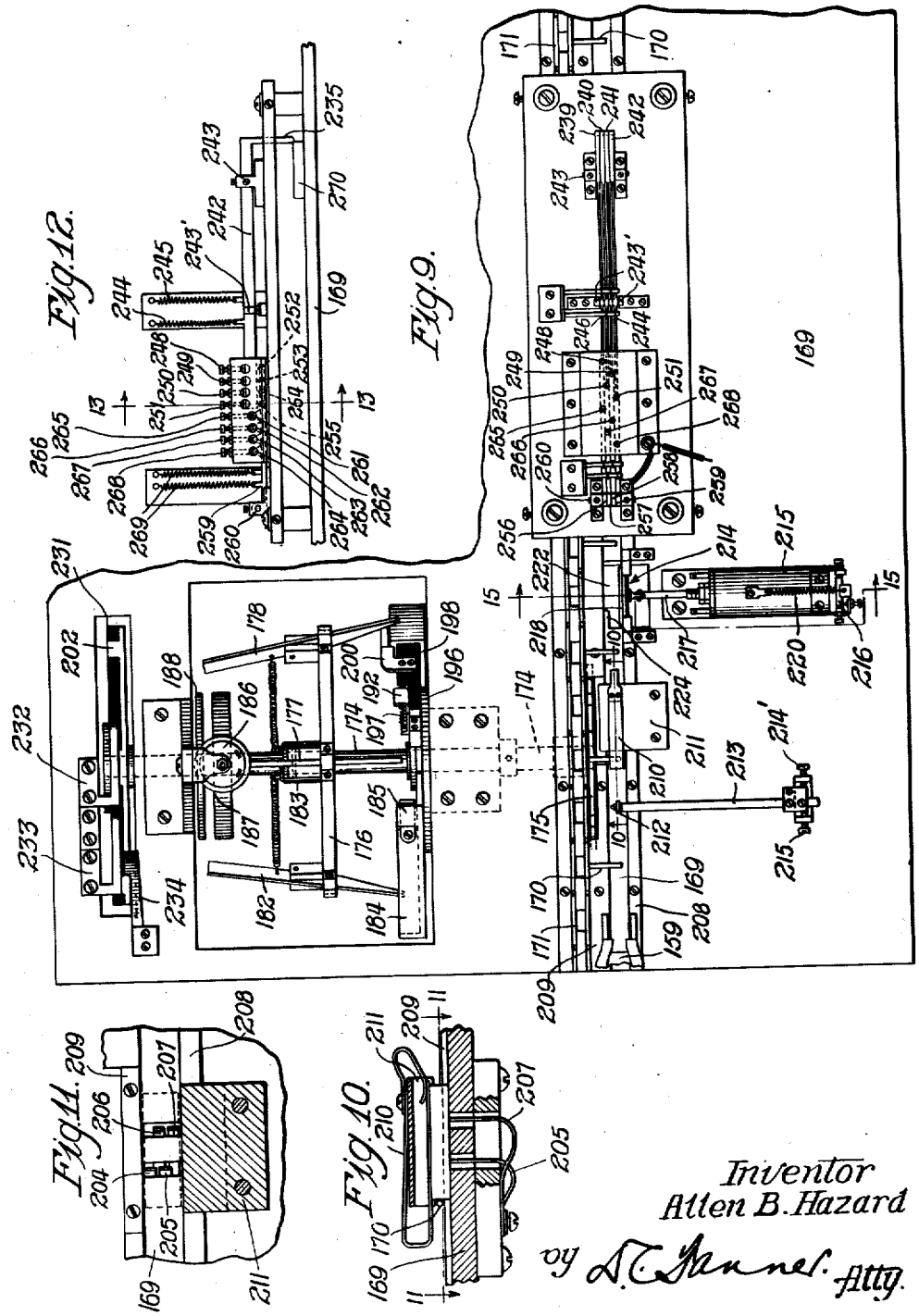

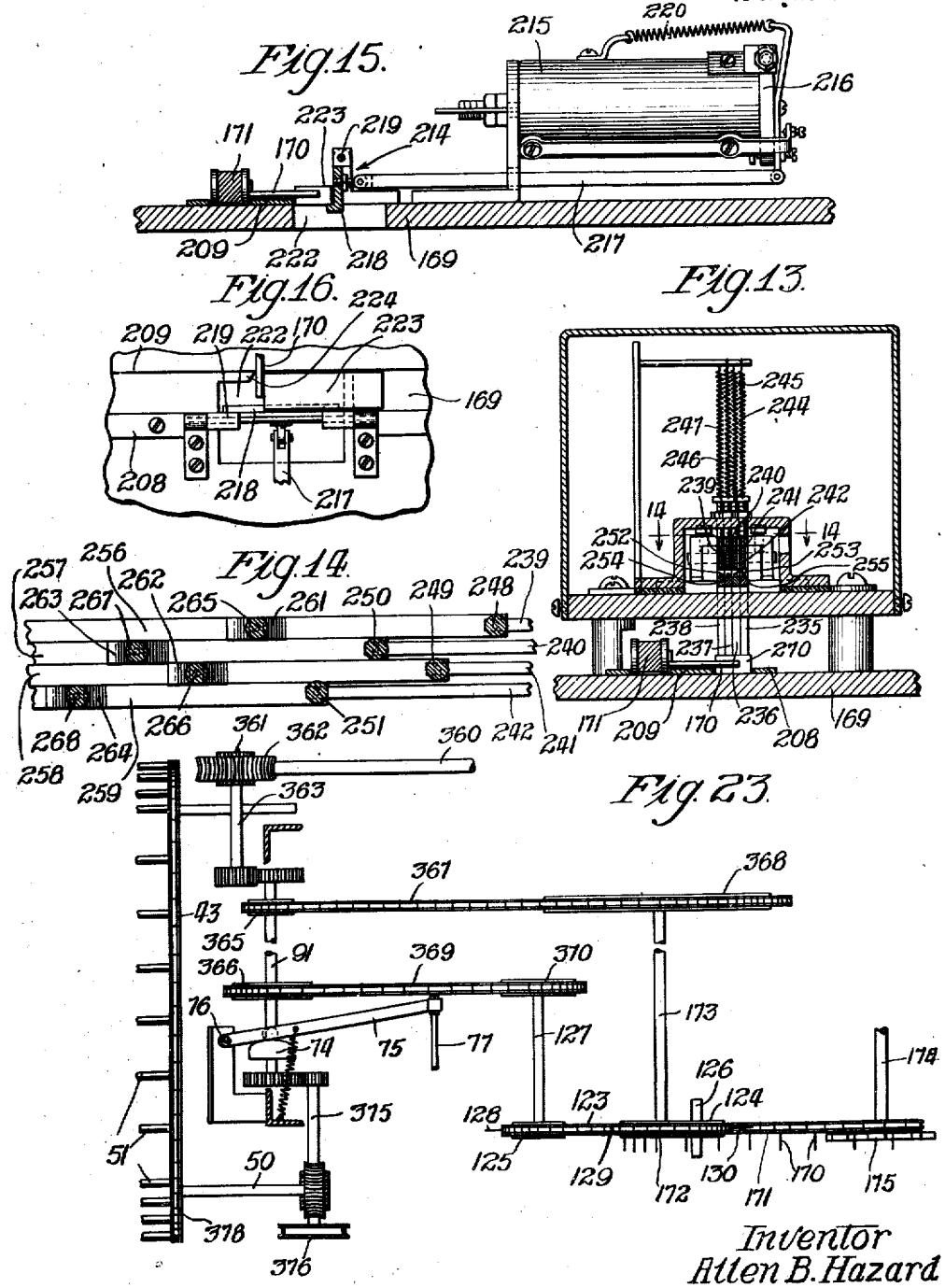

A. B. HAZARD.
TESTING SYSTEM, PROCESS, AND MACHINE.
APPLICATION FILED JAN. 13, 1917.
1,341,463.
Patented May 25, 1920.
12 SHEETS—SHEET 8.
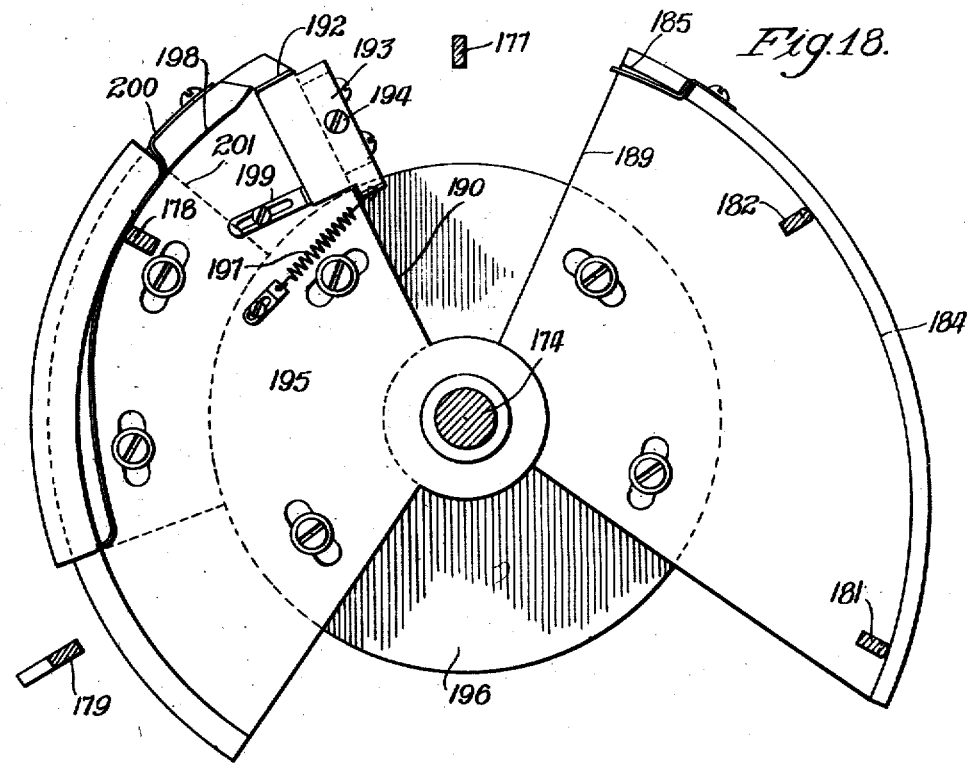
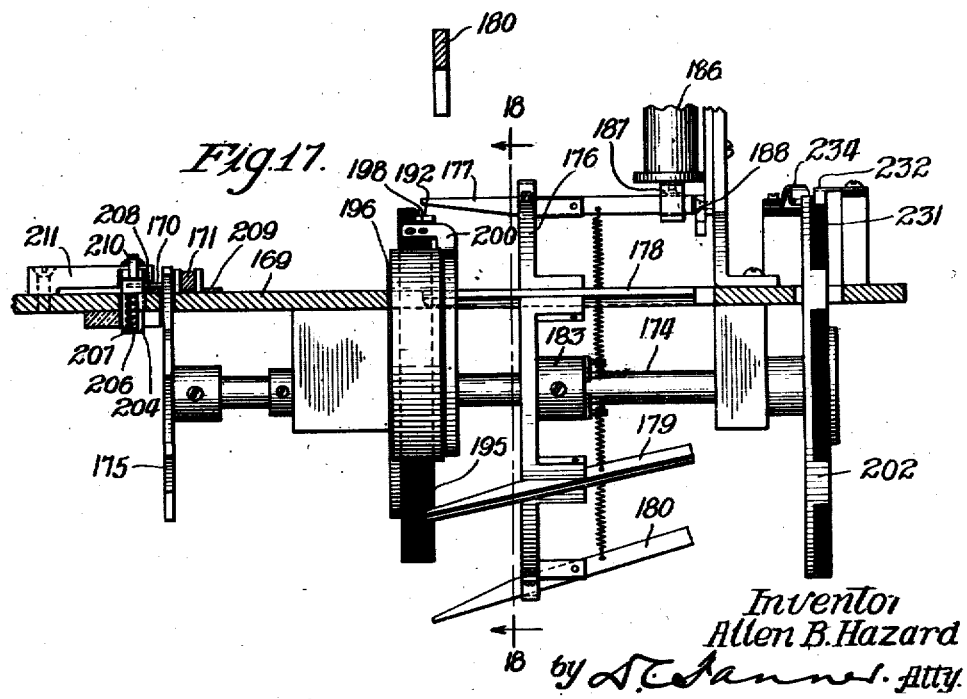
Inventor
Allen B. Hazard
by S. C. Tanner, Atty.

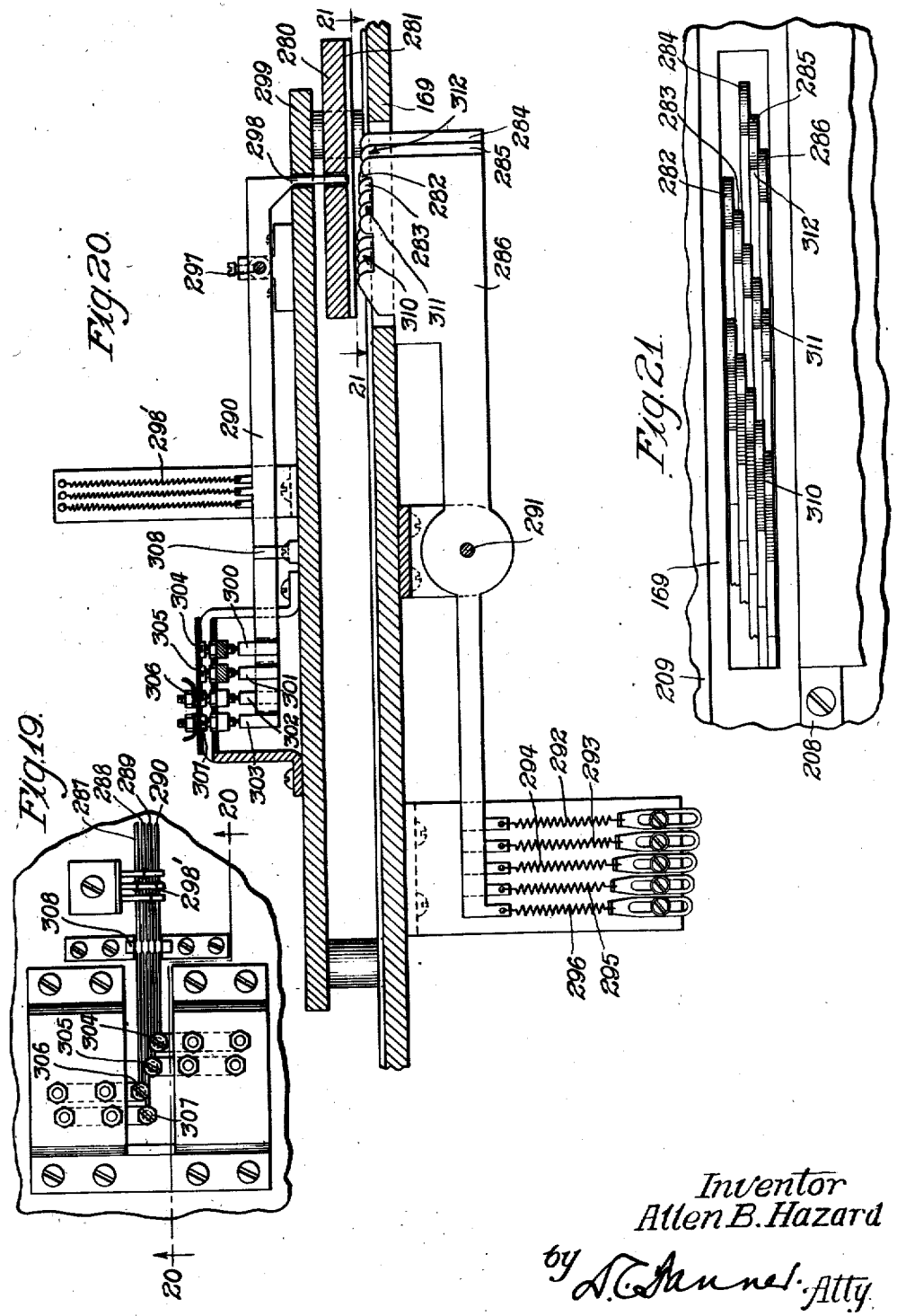

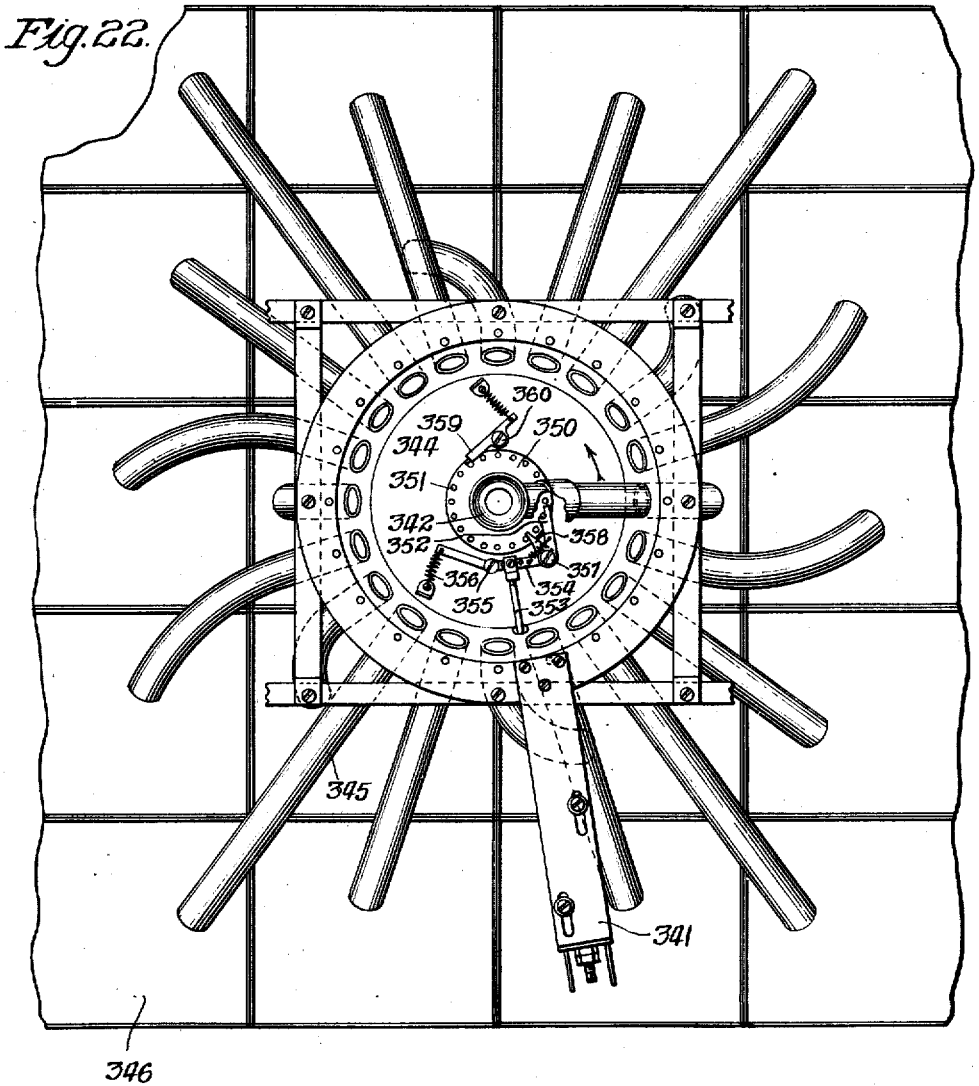

A. B. HAZARD.
TESTING SYSTEM, PROCESS, AND MACHINE.
APPLICATION FILED JAN. 13, 1917.
1,341,463.
Patented May 25, 1920.
12 SHEETS—SHEET 11.
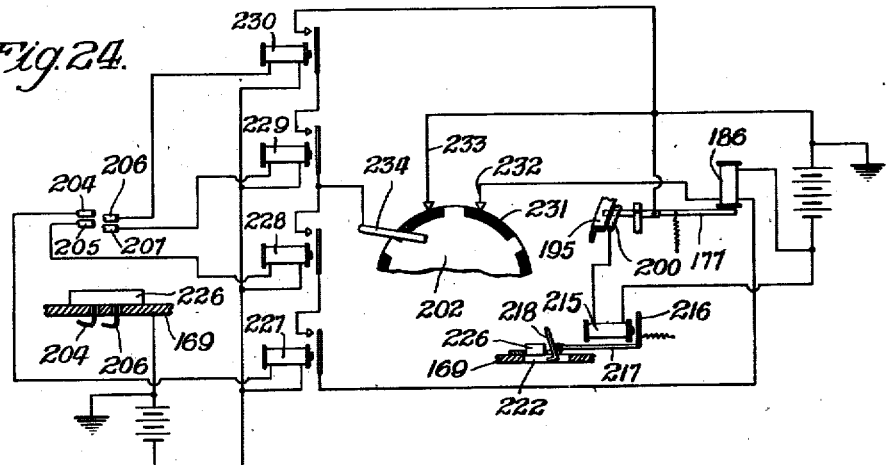
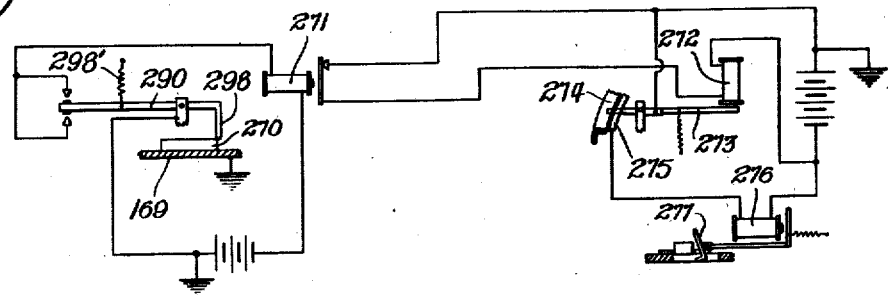
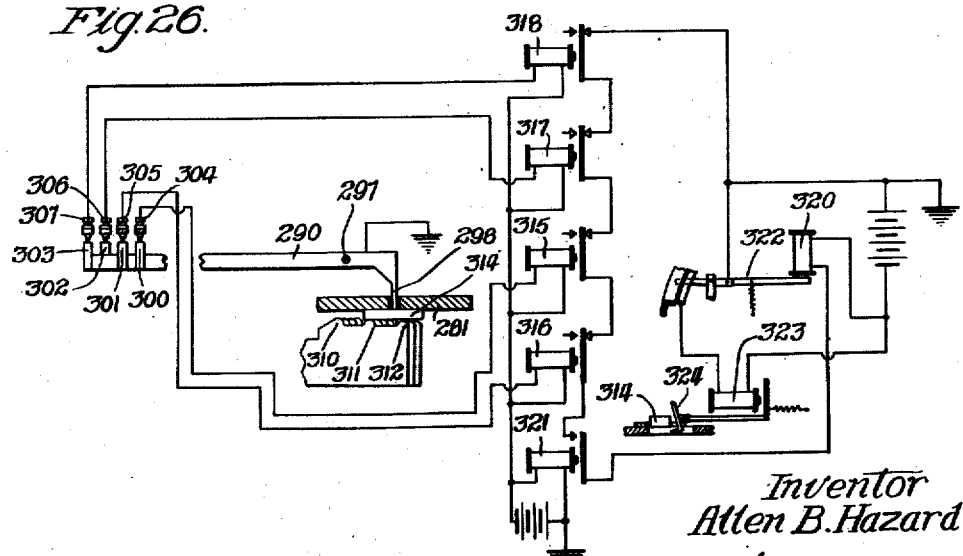
Inventor
Allen B. Hazard

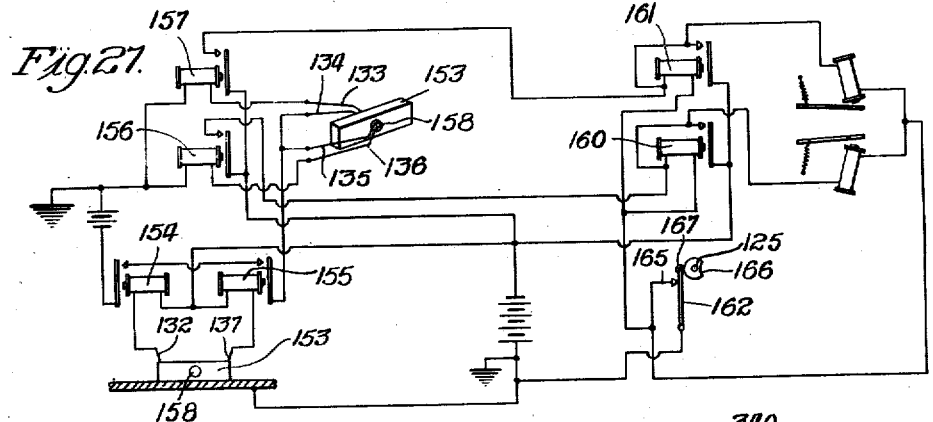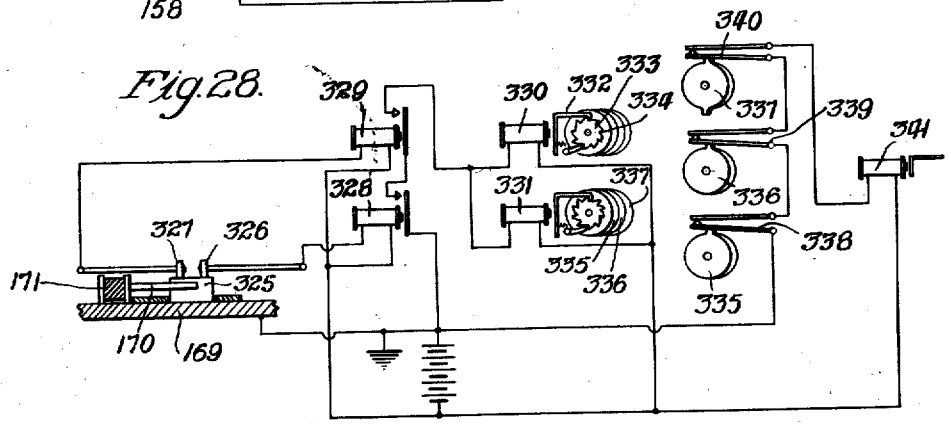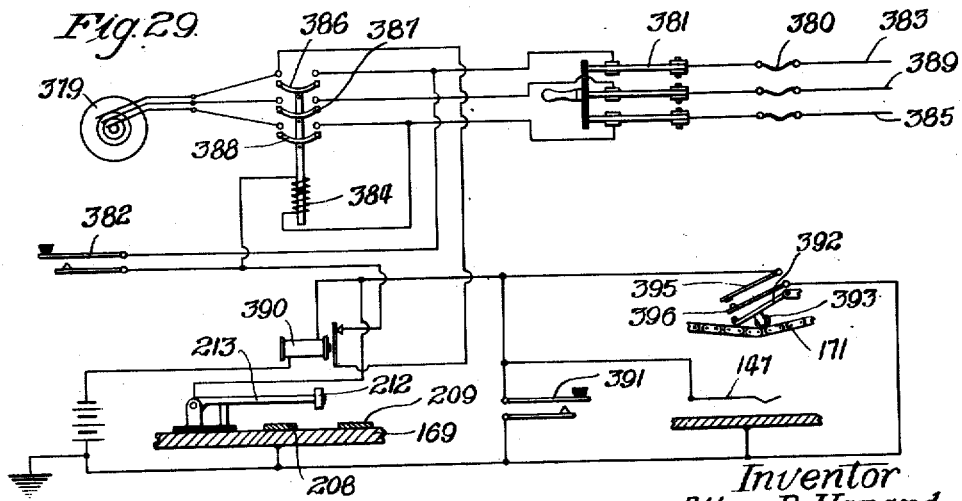

UNITED STATES PATENT OFFICE.

ALLEN B. HAZARD, OF BERWYN, ILLINOIS, ASSIGNOR TO WESTERN ELECTRIC COMPANY, INCORPORATED, OF NEW YORK, N. Y., A CORPORATION OF NEW YORK.

TESTING SYSTEM, PROCESS, AND MACHINE.

1,341,463.  Specification of Letters Patent.  Patented May 25, 1920.

Application filed January 13, 1917. Serial No. 142,177.

*To all whom it may concern:*

Be it known that I, ALLEN B. HAZARD, a citizen of the United States, residing at Berwyn, in the county of Cook and State of Illinois, have invented certain new and useful Improvements in Testing Systems, Processes, and Machines, of which the following is a full, clear, concise, and exact description.

This invention relates to an improved testing system, process, and machine, and more particularly to a process and machine for inspecting the physical dimensions of rectangular articles for checking the degree of perfection of their plane surfaces and for testing the conductivity of the articles as a whole and the relative conductivity of different parts thereof.

The specific embodiment of the invention herein illustrated and described is directed to a system, process, and machine for automatically testing carbon protector blocks. These blocks are used in high potential protective devices and serve in connection with a suitable dielectric to protect the apparatus from the destructive action of lightning discharges and other high potentials which are occasionally impressed upon line conductors. The carbon blocks are used in the protective devices in pairs, one of the blocks of each pair being connected to the line circuit and the other block to ground. One of the surfaces of each block is ground to present a true, flat surface and in the center of one of these blocks is secured a circular disk of fusible alloy. The ground surfaces of the block are mounted face to face in the protective apparatus and are separated by the dielectric. Whenever a high potential current is impressed upon the line, the potential will jump from one block to the other, notwithstanding the separation due to the dielectric, and if said potential is high enough it will melt the fusible alloy and permanently connect said line wire to ground through the carbon blocks.

In order that the blocks may properly function as above described, they must be carefully tested and inspected, the allowable variation from specified requirements being very minute. It has consequently been the custom in the past to conduct these inspections and tests manually, and this was an exceedingly expensive, tedious, and inefficient operation. It is the object of this invention to provide a system, process and machine that will entirely displace this manual inspection of the blocks containing the central disk of fusible alloy. The invention is not limited in its application, however, to the testing of carbon blocks, as other embodiments thereof are contemplated for making similar tests on other articles.

One of the features of this invention consists in means for detecting the presence and the position of the fusible alloy in the block and means for guiding the blocks so that they will be presented to the test plate with the ground or alloy side up.

Another feature relates to means for testing the conductivity of the blocks as a whole and eliminating those blocks which fail to meet the specified conductivity.

Another feature relates to a gaging means for testing the physical dimension of the blocks and eliminating those which fail to fall between certain prescribed maximum and minimum limits.

Still another feature resides in a device for checking the degree of perfection of the plane or ground surfaces and eliminating those blocks which have a concave or convex surface greater than the prescribed minimum.

An additional feature of the invention consists in an improved means for counting and distributing the blocks after they have been tested.

With these and other objects in view, the invention consists of the apparatus herein illustrated and described and pointed out in the appended claims.

The invention is illustrated in the accompanying drawings in which:

Figure 1 is a side elevation of a complete machine embodying the features of this invention;

Fig. 2 is a top elevation of an improved hopper mechanism which may be used in this invention;

Fig. 3 is a section on the line 3—3 of Fig. 2;

Fig. 4 shows plan of an improved mechanism used in this invention for removing the blocks from the magazine;

Fig. 5 is a side elevation of a portion thereof, as indicated by the line 5—5 in Fig. 4;

Fig. 6 represents a top plan view on the line 6—6 of Fig. 1 of the driving means for the mechanism illustrated in Fig. 2;

Fig. 7 exhibits a plan elevation of the alloy testing means;

Fig. 8 is a vertical section on the line 8—8 of Fig. 7 looking in the direction of the arrows;

Fig. 9 is a plan elevation of the conductivity testing means and its associated identification mechanism and the gaging mechanism;

Fig. 10 is a vertical section of the conductivity testing means on the line 10—10 of Fig. 9;

Fig. 11 is a horizontal section on the line 11—11 of Fig. 10 and shows the conductivity testing springs projecting through the test plate;

Fig. 12 illustrates a side elevation of the gaging mechanism;

Fig. 13 is a vertical section on the line 13—13 of Fig. 12 looking in the direction of the arrows;

Fig. 14 shows a plan of the movable levers of the gaging mechanism taken on the line 14—14 of Fig. 13 looking in the direction of the arrows;

Fig. 15 is a vertical section on the plane of Fig. 9 and illustrates the gate utilized for rejecting defective parts and its associated operating means;

Fig. 16 exhibits a plan view of the gate illustrated in Fig. 15;

Fig. 17 is an end elevation of the identification mechanism shown in Fig. 9;

Fig. 18 is a vertical section on the line 18—18 of Fig. 17;

Fig. 19 represents a plan elevation of a portion of the surface gaging means;

Fig. 20 is a vertical section on the line 20—20 of the entire surface gaging means;

Fig. 21 is a horizontal section on the plane 21—21 of Fig. 20 which illustrates the relative position of the operating levers which hold the block against the plane testing surface;

Fig. 22 is a horizontal section on the plane 22—22 of Fig. 1 and illustrates the distributing mechanism;

Fig. 23 is a diagrammatical illustration of the power distributing system;

Fig. 24 is a circuit diagram illustrating the conductivity testing system;

Fig. 25 is a circuit diagram of the gaging system;

Fig. 26 is a circuit diagram of the surface testing system;

Fig. 27 is a circuit diagram of the alloy testing system;

Fig. 28 is a circuit diagram of the counting and distributing system, and

Fig. 29 is a circuit diagram of the power system illustrating the protective devices utilized therewith.

The machine in the form here illustrated consists essentially of seven parts, as illustrated in Fig. 1, namely, the hopper and bucket feed system and the associated means for eliminating broken parts and foreign matter designated as 30; the magazine and the mechanism for periodically removing the blocks one at a time from said magazine to the testing system 31; the alloy testing mechanism 32; the conductivity testing mechanism 33; the gaging mechanism 34; the surface testing mechanism 35, and the counting and distributing mechanism 36. To facilitate the following description, each one of these parts will be described separately in the order mentioned, following which a general description of the operation of the machine as a whole will be given in which the correlation of the various parts of the machine will be described.

The hopper and bucket feed mechanism and its associated parts is illustrated in Figs. 2 and 3. As there indicated, the mechanism is supported on uprights preferably of angle iron such as 37 and 38. The hopper proper 39 and its associated parts is made of sheet iron and comprises a receiving trough 40 having an inclined bottom into which the carbon blocks which are to be tested are dumped promiscuously. The hopper 39 will hold approximately 10,000 blocks, and has its bottom 42 inclined so that the blocks will be fed to the buckets of the carrier system by the force of gravity. The bucket or carrier system comprises two endless chains 43 and 44 which are carried by a series of sprocket wheels such as 45 and 46 mounted on shafts that extend all the way across the machine. These sprockets act as idlers and the chains are driven by a pair of sprocket wheels mounted on the shaft 50 which is driven from a motor by a power transmission system to be described hereinafter. Mounted between the two endless chains is a series of U shaped buckets such as 51 which function to pick up the blocks a few at a time from the hopper, as these buckets are pulled by means of the chains through the delivery chamber 49 of the hopper, and deposit them on and propel them across the plates which serve to eliminate broken and badly chipped blocks as well as foreign material. The travel of the chains and buckets, as indicated in Fig. 3, consists of a perpendicular rise through the delivery chamber 49, a rise at an angle of about 25 degrees to the perpendicular to the broken block and foreign material eliminating plates, a horizontal movement across said plates above and over the top of the hopper, a perpendicular drop, and a horizontal movement underneath the hopper. This movement of the buckets 51 causes them to pick up a plurality of the carbon blocks—on an average above five—as the buckets make the perpendicular rise through the delivery hopper 49. When the buckets pass up the inclined rise any blocks which are resting loosely on said buckets and are, therefore, not well lodged within the buckets will fall back into the hopper. This inclination is provided for this purpose so that these blocks will not cause trouble by catching between the top plate and the sides of the bucket. As the position of the bucket changes from the inclined path to the horizontal path the blocks within the bucket fall out upon the broken block and foreign material eliminating device or top test plate and the blocks are then pushed ahead of the buckets across said plate. The purpose of the broken block and foreign material eliminating plate is to remove all broken blocks and foreign material which is picked up by the buckets, so that these parts will not be delivered to the test system in which they would create considerable trouble.

The top test plate consists of four pieces of flat sheet iron plate 52, 53, 54, and 55, so placed with respect to one another above the hopper as to form two diagonal slots 56 and 57 and one slot 58 which is parallel to the direction of movement of the buckets and located in the center of the test plate. The diagonal slots 56 and 57 are so positioned that nothing can cross the plate without first crossing either one of these slots. The width of these slots and the angle formed between them and the direction of travel of the buckets is such that all broken blocks and foreign material, such as the broken blocks 28 and 29 illustrated in Fig. 2, will fall into these slots. Under these slots are located the pans 60 and 61 for catching this material. Unbroken blocks, such as 27 for example, which are resting on either their top or bottom faces will span and cross over the slots as they are pushed along by the buckets. However, any blocks which have their corners chipped off, such as 26, and which are pushed across the test plate with the chipped corner on the advancing side of the block, will neither span nor fall all of the way into the slots, but the chipped portion of such blocks will catch in the slot and move along on the edge of the slot as it is advanced by the bucket. The chipped blocks which catch in either of the diagonal slots 56 and 57 will consequently be carried diagonally across the face of the plates 55 and 54 as they ride on the edge of the slots 56 and 57. In this movement the chipped blocks which are thus caught will push good blocks, that are being propelled by the same bucket, toward the center of the plate. If the bucket which is propelling the chipped blocks is also propelling a number of good blocks, this action of the chipped blocks would result in the jamming of the good blocks against the side of the bucket. To prevent this the slot 58 parallel to the direction of movement of the buckets has been provided. This slot is considerably wider than the long dimension of the block, and consequently when a chipped block pushes other blocks toward the center of the plate these blocks will fall through the slot 58 back into the hopper 39. This is illustrated by the chilled block 25. Chipped blocks, however, will move along the edge of the diagonal slots 56 and 57 until they reach the ends thereof, where they will fall into the chute 63 from where they will slide into either one of the reject pans 60 or 61.

As indicated in Fig. 2, the chute 63 is provided with a V shaped opening and shoulder 64 which prevent the fouled blocks from falling into the hopper, but forces them down the chute 63 into the reject pan. The slot 58 is cut out at 65 and 66 so that good blocks, which are being propelled by the buckets and which are located on the plates 52 and 53 so that a portion of their length projects into the slot 58, will not be carried along by these buckets to the pointed end of these two plates and there dropped into the reject chute 63. Blocks thus located when they reach the cut-off portions 65 and 66, as illustrated by block 24, will be dropped back into the hopper 39.

As hereinbefore stated, all blocks which rest on either one of their top or bottom faces will span the slots. When the blocks fall from the bucket onto the plate some come to rest on their top or bottom faces and others on their side faces. All blocks which come to rest on their side faces must be tipped over onto their top or bottom faces so that they will be properly delivered to a magazine feed belt 68. To accomplish this a slight drop of about $\frac{1}{16}$ of an inch is provided at 67, as indicated in Fig. 3. Blocks resting on their top or bottom faces pass over this drop and retain their same position, whereas all the blocks which rest on either one of their side faces will be tipped onto either their top or bottom face as they pass over this drop.

When the blocks have been pushed across the broken block and foreign material eliminating plate, they drop onto a horizontal belt 68 located at the end of the plate. This belt is constantly moving and feeds the blocks into a magazine. As the blocks fall from the plate they make a turn of a quarter of a revolution and come to rest on the belt on one of their side faces and are fed in this position into the magazine. Any blocks which reach the end of the top plate and which miscarry and are not lodged onto the horizontal belt 68 drop on the vertically inclined chute 69, on which they will slide back into the hopper 39. The horizontal endless belt 68, as clearly indicated in Fig. 1, is mounted on the pulleys 70 and 71. The blocks fed to the belt 68 are moved along and fed to the magazine 72, which consists of an inclined trough down which the blocks move by the force of gravity. The blocks are fed into this magazine end first on their sides with the top or alloy face either to the right or left and are held in this position by the sides of the magazine. When the top of the block is hereinafter referred to in specification, in order to facilitate the description, it will be understood that the surface of the block in which the fusible alloy is located is the one designated.

The magazine functions to hold the blocks in readiness for testing from which they are delivered to the testing system at regular intervals in accordance with the rate established for the machine at which the blocks can be conveniently tested. The magazine is necessary because the buckets do not function uniformly, that is, they do not pick up blocks in the same quantities. Thus one bucket may ride through the delivery chamber 49 without picking up a single block, and another bucket may pick up as many as ten blocks. Thus the magazine compensates for the unsteady feed of the buckets by storing up the blocks when they come to it faster than they are removed and by feeding out the stored blocks when the bucket feed falls below the magazine feed.

Located at the end of the magazine 72 is a device for moving the blocks from the magazine one at a time and delivering them to the testing system one at a time. This mechanism, as clearly illustrated in Figs. 4 and 5, consists of a circular disk 73, free to turn about its center and mounted at the same angle to the horizontal as the magazine, as shown in Fig. 5. The disk 73 is moved periodically through an angle of 90 degrees by the action of a cam 74 and its associated mechanism, shown in Fig. 6. A roller secured to a rod 75 rides on the cam 74, one end of said rod being pivoted at 76 and the other end thereof being secured to the rod 77. Secured to the lower end of the rod 77 is the link 78, one end of which is pivotally secured to the rod 77 at 79 and on the other end of which is pivotally secured the ratchet 80 which is pivoted at 81. The link 78 is loosely mounted on the shaft 82, to which is secured the disk 73 and the ratchet wheel 83. Pivotally secured to the frame 84 of the machine at 85 is the centering and retaining pawl 86. The roller in the rod 75 is held against the surface of the cam 74 by the spiral spring 87 and the ratchet 80 is held in contact with the ratchet wheel 83 by the spiral spring 89. The spiral spring 90 controls the movement of the retaining pawl 86. Consequently when the shaft 91 is turned, the cam 74 in each revoluton will impart to the rod 75 a reciprocating motion. On the upward stroke of each one of these reciprocations, which is the position indicated in Fig. 6, the pawl 80 will engage a tooth of the ratchet 83, and on the downward movement of the rod 75 the rod 77 will turn the link 78 about the axis 82, thereby causing the pawl 80 to turn the ratchet wheel 83 through an angle of 90 degrees. The amount of this movement is controlled by the retaining and centering pawl 86 which is depressed by a suitable projection on the link 78 and which will, therefore, ride on the surface of the ratchet wheel 83 until the tooth of the retaining pawl 86 falls into one of the depressions 93 located 90 degrees apart on the surface of the ratchet wheel 83 and which then serves to counteract the action of the spring 87 and thereby prevents further movement of the rod 75 and its associated mechanism. The turning of the ratchet wheel 83 will turn the shaft 82 and likewise the disk 73 through an angle of 90 degrees, and the retaining and centering pawl 86 is adjusted so that each movement of the disk 73 will bring a pair of the carbon block slots or holders 94, 95, 96, or 97 into direct alinement with the magazine 72 and the guiding slot 98 which leads to the alloy test plate.

It will consequently be evident that each time the disk 73 is turned, a carbon block holder is brought directly in front of the magazine so that a block may fall from the magazine into the holder and at the same time a block located in the holder diametrically opposite to the one receiving the block will fall from its holder into the slide slot 98 and from there on to the alloy test plate. Due to the inclination of this disk the blocks are fed to and from the same by the force of gravity. As each block that is dropped into the holder is carried away from the magazine, the following block in the magazine will slide down and strike the upright peripheral wall 100 of the disk 73, and the other blocks in the magazine, due to the wall 100, will, therefore, be held back until the next carbon block holder is moved into a position directly in front of the magazine.

Located at the end of the magazine is a gate 101 which is pivotally mounted on the pin 102 and which is used to prevent a block falling part way into the holder at the moment that the disk starts to move, which action would result in the breaking of the blocks. The gate is normally held open by the action of a spring or in any other suitable manner, and is closed by any one of the links 103, 104, 105, and 106 which are provided with arcuated surfaces at their outer periphery which swing into the path of the gate and move the gate with it to close the magazine, providing there is no block protruding from the end of the magazine at the time that the disk 73 stops. Associated with each one of these links 103, 104, 105, and 106 are the arms 107, 108, 109, and 110 respectively which are provided with a curved surface concentric to the outer periphery of the disk 73. Either one of these arms will hold the gate closed until the holder is moved away from the magazine and hence prevents any blocks entering the holder which may come down the magazine after the disk has come to rest. If a block is protruding from the end of the magazine when the holder arrives in front of said magazine the gate will not be closed, due to the presence of said block, and the arcuated surfaces of either one the links 103, 104, 105, and 106 will be depressed toward the outer periphery of the disk 73 against the tension of either the spiral springs 111, 112, 113, and 114 respectively.

The carbon blocks are readily retained in said holders by the force of gravity while they are rotating through the upper quadrant, and to prevent the blocks from being dropped out of said holders during the rotation through the lower quadrant, the sheet metal arc 115, concentric with the outer periphery of the disk 73, is provided for this lower quadrant which serves to retain the carbon blocks in the holders until the disk 73 has been revolved to a position where the holder will be in alinement with the slide chute 98.

The carbon block in the holder in alinement with the chute 98 will slide down said chute and be delivered to the plate of the alloy test mechanism illustrated in Figs. 7 and 8. The blocks will be delivered from the holder in such a manner that they will rest on said plate on one side or the other with the alloy face of the block either to the right or to the left. The block will be held between the guiding or retaining walls 120 and 121 of the alloy test plate and will rest directly above a slot 122 in said plate. Directly beneath this slot 122 is an endless chain 123 which is mounted on the driving sprocket wheel 125 and the idler sprocket 124, said sprockets being mounted on the shafts 126 and 127 respectively. This chain is equipped with three pins 128, 129, and 130, said pins projecting through the slot 122 and protruding above the surface of the test plate and function to push the blocks between the retaining walls 120 and 121 to the operating elements of the alloy testing mechanism.

The alloy testing mechanism functions to eliminate blocks in which the alloy is either missing, or fails to meet the specified conductivity requirements, or in which the alloy is not centrally located. It likewise functions to deliver the blocks to the conductivity testing mechanism with the top face of the block turned up, and for this purpose the alloy test plate is located about six inches above the test plate of the conductivity testing system, the blocks being delivered from the alloy test plate to the plate of the conductivity system by means of chutes located below the alloy test plate. As the blocks leave the chute 98 and slide onto the test plates, there is an occasional tendency for one of the blocks to jump, and this action is counteracted by the spring 131. The block is next moved along between the retaining walls 120 and 121 by one of the pins in the chain 123 and is first connected to the contact spring 132, then to the contact springs 133, 134, 135 and 136, and finally to the contact spring 137. These contact springs, together with a block, establish various circuits which determine the subsequent movement of the block on the alloy test plate. The contact springs 132 and 137 are so located that they will simultaneously make contact with a block for only a very short interval of time, and they are located with reference to the springs 133, 134, 135, and 136 so that said period of simultaneous contact will occur at the time that the springs 133 to 136 inclusive are making contact with a small portion of the block located exactly in the center, that is, either one of the paired springs 133 and 134 or 135 and 136 will make contact with the circular disk of fusible alloy, provided the same is properly located in the block. The paired springs 133 and 134 and 135 and 136 function to detect the presence or absence of the alloy and also serve to locate the side of the block in which the alloy is embedded, determine whether or not the surface of the alloy is clean, so as to give the required degree of conductivity, and likewise to test the location of the alloy in the side and to determine that it is not too far off center.

The electrical tests made by these springs are dependent upon the fundamental principle that the contact resistance between the springs and the carbon block varies very considerably with very slight variations in the pressure between the carbon and the springs; whereas the contact resistance between the springs and the alloy varies considerably less with a similar amount of variation in pressure. Therefore, by properly adjusting the pressure between the springs and the carbon block it is possible to so control the operation of a relay that it will operate when the springs make contact with the alloy and will remain inert when the springs make contact with the carbon block. The contact springs 132 and 137 serve to aid the paired springs 133 and 134, and 135 and 136 in detecting such blocks in which the alloy is not centrally located in the block. This is accomplished by controlling the circuits which include the paired springs 133 and 134, and 135 and 136 by electromagnetic operated means which are actuated only at the time that the paired springs are making contact with that portion of the block in which the alloy should be located. The springs 133, 134, 135, and 136 are included in circuits which control relays which in their turn control other relays and the electromagnetic gate operating devices 138 and 139. These electromagnets 138 and 139 control the gates 140 and 141 respectively which are pivoted at 142 and 143 respectively.

As the carbon block leaves the retaining walls 120 and 121 it is pushed between the centering springs 145 and 146 and passes under the contact spring 147. The block does not make contact with the spring 147 unless it meets some obstruction whereby it is jammed and raised out of position; when thus raised, however, the surface of the block will make contact with this spring which will close a circuit including a circuit breaking mechanism which will be operated and stop the operation of the testing machine as a whole, thereby preventing damage to the machine parts due to the jammed block. The gates 140 and 141 are normally held by springs 150 and 151 respectively in such a position that a block which passes through the centering springs 145 and 146 will readily pass between these gates and into the reject chute 152. A block entering the reject chute 152 will be carried down said chute on its bottom and then slide to the side horizontally from where it will be turned and dropped on its end into a discharge tube 159' which leads to a suitable receptacle for rejected blocks.

A further description of the apparatus associated with the alloy test system, together with the operation of the circuits associated therewith, will now be described in connection with the circuit diagram illustrated in Fig. 27. To simplify the circuit diagram the carbon block 153 under test is shown in its position on the test plate connected to the contact testing springs 132 and 137 and is also illustrated in another part of the drawing with the paired contact test springs 133 and 134 and 135 and 136 connected to the block.

As the carbon block is pushed forward between the retaining walls 120 and 121 it is first connected to the contact test spring 132 which completes a circuit which may be traced from the grounded test plate through the carbon block and relay 154 to the negative side of battery. The relay 154 is consequently energized and the negative battery is connected to the make contact of said relay. The block is next passed between the pairs of contacts 133, 134, 135, and 136 which has no immediate effect upon the operation of the circuit. However, as the block advances and the contact test spring 137 is connected to the block, at which time the paired springs 133 and 134 and 135 and 136 are in the exact center of the block, a circuit is completed from the ground on the test plate by way of the carbon block and test contact 137 through the relay 155 to negative battery. The relay 155 will consequently be operated and this will complete a circuit from negative battery through the armature and make contact of relay 154 previously operated, the make contact and armature of relay 155 and then through the two parallel branches composed respectively of the paired contact springs 135 and 136 and the relay 156 and the paired contact springs 134 and 133 and the relay 157 to ground.

The relays 156 and 157 are marginal and will not operate if the circuit just traced is completed through the carbon surface of the block; but if either one of the paired contact test springs rest on the fusible alloy 158, sufficient current will flow in the circuit to operate the marginal relay associated with that pair of contacts. Consequently if the fusible alloy is not properly positioned, or the block is not equipped with the fusible alloy, or the surface contact of the fusible alloy presents a dirty or mutilated surface of a resistance greater than desired, the marginal relays 156 and 157 will not operate. The marginal relays 156 and 157 control respectively the operation of the locking relays 160 and 161, which in turn control the operation of the gate controlling electromagnets 139 and 138. Therefore, if the alloy is not properly centered, is missing, or presents a surface of low conductivity, neither one of the gates 140 or 141 will be operated, and the block will be propelled by one of the pins in the chain 123 to the chute 152, through which it will be carried to a receptacle for defective blocks. If the alloy is properly centered and presents a surface of the desired conductivity to either of the paired springs 133 and 134 or 135 and 136, the marginal relay associated with said pair of springs will operate.

In the circuit diagram illustrated in Fig. 27, contact springs 135 and 136 are shown in contact with the fusible alloy disk and consequently the marginal relay 156 will be operated. This will complete a circuit which may be traced from battery through the armature and make contact of relay 156, the coil of relay 160, and the cam actuated contacts 165 and 162 to ground. This will cause the actuation of the relay 160 which will complete a locking circuit for said relay traceable from battery through the armature and make contact and coil of said relay, and the cam actuated springs 165 and 162 to ground. The actuation of the relay 160 will in turn complete a circuit which may be traced from battery through the armature and make contact of said relay and the gate actuating electromagnet 139 and the cam actuated springs 165 and 162 to ground.

The operation of the electromagnet 139 will swing the gate 141 into its operated position across the path of the carbon block under test and will thereby deflect said carbon block into the chute 163. If the carbon block had been presented to the contact springs with the fusible alloy on the other side of the block, the electromagnet 138 would have been energized in a similar way and the block under test would have been deflected into the chute 164. Chutes 163 and 164 unite at their ends in a common chute 159. The operated gate 141 will remain in its displaced position until the locking circuit for the relay 160 is interrupted. The continuity of this circuit is controlled by the cam actuated spring 162 which breaks connection with the contact spring 165 once for each revolution of the sprocket wheel 125, said operation being controlled by the cam 166 and the roller 167 associated with the spring 162 which rides on the periphery of said cam. The chain drive for the block is so designed that the sprocket wheel 125 and the cam 166 will revolve in such a manner that the depression in the cam 166 will coöperate with the roller 167 of the spring 162 immediately after the block under test has been properly directed into the chute associated with the particular gate operated. When the roller 167 rests in the depression of the cam 166, the connection between the springs 162 and 165 is interrupted, which opens the locking circuit of the relay 160 and its associated gate controlling electromagnet 139, and since the block under test has been moved so as to be out of contact of the springs 135 and 136, the relay 160 and electromagnet 139 will be deënergized and their armatures returned to normal. The springs 165 and 162 are inclosed by a suitable hood 168 which is provided with a slitted opening for the introduction of the cam surface 166.

As illustrated in Figs. 7 and 8, if the momentum of the block after it leaves its driving pin is insufficient to carry it into the particular chute 163 or 164 selected, the particular gate 140 or 141 in returning to normal position under the action of the springs 150 or 151, as the case may be, will push the block into the chute below the gate. The chutes 163 and 164 are so constructed that they will give the block a 90 degree turn and will deliver it through the agency of the force of gravity onto the main test plate 169 common to the conductivity testing mechanism, the gaging mechanism, the surface testing mechanism, and the counting and distributing mechanism with the alloy side up. As the block emerges from the chute 159 it is picked up and pushed along the entire length of this plate by means of pins such as 170 projecting from the side of an endless chain 171 which is propelled by a sprocket wheel 172 mounted on a shaft 173 along the top surface of said plate, returning underneath said plate, as illustrated in Figs. 1 and 8. After the blocks emerge from the chute 159 and are picked up by the pins 70 and 170 they will be moved along said plate at a constant, uniform rate of speed and are tested as they are moved by the pins through the testing mechanisms provided.

Associated with each of the testing systems located on the main test plate 169 is an identifying mechanism which is identical for all said testing mechanisms except that the identifying mechanism for the conductivity testing system is equipped with an additional means which will be referred to hereinafter. To avoid repetition in the description of these testing systems and to simplify the description thereof, the mechanism used for identification, as illustrated in Figs. 9, 17, and 18, will be described first.

The blocks tested in the various mechanisms associated with the main test plate 169 are placed under pressure during test, and as they are constantly moving during each test it is impractical to eliminate defective blocks at the moment that a defect is detected. It is the function of the identifying mechanism to so identify each block as to quality as it passes through each test that after the test has been completed, the block will either be accepted or rejected according to the setting of the identification mechanism. The identifying mechanism and system is so constructed that it will not interfere in any way whatsoever with the proper functioning of the testing systems, this being necessary because one block, according to the operation of the testing mechanisms and systems, will be placed under test during the period that another block is being passed or rejected.

The mechanism as illustrated consists of a shaft 174 on which is mounted a driving wheel 175 which is equipped with six teeth which project through a slot in the test plate 169 and which lie in the path of the pins 170 contained in the side of the chain 171. Power is consequently transmitted to said wheel 175 by the pins of the test chain 171, these pins also being utilized to push the blocks along the test plate through the various testing mechanisms. Since the pins which propel the wheel 175 also serve to push the blocks on the test plate, the relation between the movement of the blocks on the test plate and the movement of the shaft 174 driven by the wheel 175 will remain constant. Mounted on the shaft 174 is a disk 176, in the periphery of which are mounted six levers 177, 178, 179, 180, 181, and 182. These levers are pivotally mounted and are free to turn about said pivot in a plane at right angles to the plane of the disk. The levers are under the control of spiral springs attached to the rearwardly extending portion of each lever and to a hub 183 and tend to take a position at an angle with the axis of the disk with the rear end of the lever inclined toward said axis. As each of these levers is moved to the space occupied by lever 180, as shown in Fig. 18, by the revolution of the disk 176 it will assume the inclined position as indicated for levers 180 and 181. As the disk 176 is revolved the forward end of the lever is displaced toward the disk axis by a cam surface 184, this cam surface being so designed that the forward end of a declined lever will be moved under the protruding cam surface. As each lever is rotated around this cam surface it will gradually assume a horizontal position parallel to the axis of the disk, which will be the position of each lever when it reaches the end of said cam surface. As the levers leave the end of the cam surface 185 they pass into a magnetic field produced by a coil 186 and are dependent for their horizontal position upon this magnetic field. The extreme rear end of each lever in this position acts as an armature for this coil, and when the lever is in its horizontal position it completes a magnetic circuit between the magnetic yokes 187 and 188, said magnetic circuit being composed completely of soft iron except for the two extremely small air gaps between the lever and these two yokes. The magnetic field produced by the coil 186 is sufficiently strong to hold the lever parallel to the disk axis against the action of the lever spring.

The testing mechanisms used to conduct the various tests are so timed with relation to the identifying apparatus that the test on a given block which is being pushed through the system will start at the moment that one of the levers leaves the end 185 of the cam surface. During the period that the block is being tested the lever remains in the range of the magnetic field, this interval being visualized in Fig. 18 by the space included between the radial lines 189 and 190. When the block which is being tested successfully meets the tests applied, the magnetic field developed by the coil 186 remains permanent and the lever which is identified therewith retains its horizontal position. If, however, a defect in the block is encountered by the test system, means hereinafter to be described cause the interruption of the magnetic field produced by the coil 186, and consequently the lever under the influence of its coiled spring will immediately assume its inclined position to the disk axis. When the defective portion of the block has passed out of the control of the testing mechanism and said mechanism is again testing a sound portion of the block the coil 186 will again be energized, thereby reproducing the magnetic field; but this reproduced field while sufficiently strong to hold a lever in its horizontal position is not strong enough to overcome the action of the spring which holds the lever, due to the increased air gap between the coil core and the lever.

When a lever which is in the horizontal position reaches the position of the radial line 190, which position corresponds to the completion of the test of a block, it will ride under a shoulder 192 on the metallic plate 193 which is pivoted at 194. This plate is normally held against a stop 199 mounted on the fiber section 195 of the disk 196 by the coiled spring 197. The plate 193 and its associated shoulder 192 is used to prevent jamming, which might result if a lever were released to its inclined position at the time that it was about to ride under the shoulder 192. Under such conditions the lever would rise part way and, due to the rotation of the disk 176, its side would strike the shoulder 192, and this would bend or break the lever unless a suitable yielding means is provided. The plate 193 serves this purpose by swinging around its pivot 194 against the tension of the spring 197, the shoulder 192 being gradually moved out of the path of the lever which has become jammed and the lever finally released.

However, in the normal operation of the machine the lever in its horizontal position will ride under the shoulder 192, from where it will be passed under the shoulder 198 of the disk sector or segment 195. The lever will ride under this shoulder 198 and will leave this shoulder to pass under the contact spring 200 at the position indicated by the radial line 201. The period of time consumed by the lever in passing from the radial line 190 to the radial line 201 is the same as that required for the block under test in moving from the testing mechanism to an electromagnetically controlled means which determines whether the block will be accepted or rejected because of the electrical registration of the testing mechanism during the period that the block was under test.

As the lever makes contact with the contact spring 200 a circuit is completed which will actuate an electromagnetic means to pass or accept the block. However, if the lever reaches the radial line 190 in its inclined position it will pass over the upper surface of the disk sector 195, and the electromagnetic accepting means will remain inert and the block will be rejected. As the levers leave the contact spring 200 they assume their inclined position and as the disk 176 is rotated they again come under the influence of the cam surface 184 which mechanically resets the levers to their horizontal position.

The testing systems are designed so that all the blocks which are passed through the testing mechanism will be rejected unless the lever of the identifying apparatus associated with the block under test is in its horizontal position and thereby causes the actuation of the electromagnetic means, which will pass or accept the block. This precaution is taken to prevent all possibility of accepting defective blocks which might result if certain difficulties were encountered, such as the interruption of current, for instance, under which circumstances all blocks good or defective would be rejected since it is necessary to actuate an electromagnetic means to pass the block.

The disk 202 mounted on the rear end of the shaft 174 and its associated springs is individual to the conductivity testing system and the description and use thereof will be incorporated with the description of said system.

The operation of the identification system may be briefly summarized as follows:

Each block to be tested as it enters any of the test mechanisms becomes identified with one of the levers and remains thus identified during the period of the test and until said block is either accepted or rejected. Each of said levers moves into the influence of a magnetic field in a horizontal position at the same moment that the block enters the testing mechanism. The lever is dependent for the continued maintenance of its horizontal position during the period of test upon the magnetic field of the coil 186 which is controlled by the test system, and if a defect is detected in the block the magnetic field collapses and the lever immediately assumes an inclined position which it will retain during the remainder of the test of said block. If the block is sound, the magnetic field remains constant during the test and will hold the lever in its horizontal position during the entire period of the test. Consequently a horizontal lever at the end of the test denotes a good block, whereas an inclined lever indicates a defective block. A horizontal lever will complete a circuit to operate electromagnetic means whereby the block will be passed or accepted, whereas an inclined lever fails to make such contact and the block is rejected.

As the blocks emerge from the chute 159 associated with the alloy testing mechanism they will be picked up by the pins 170 and pushed into the conductivity testing mechanism illustrated in Figs. 9, 10, and 11. This mechanism consists of four feelers 204, 205, 206, and 207 located under the main test plate 169 in such a manner that they will extend up through said plate and make contact with the bottom of the block as it moves along said plate between the retaining walls 208 and 209. These feelers, as indicated in Fig. 11, are staggered in such a manner that all of the bottom surface of the carbon block will be readily covered by them. The feelers have been divided into four units and staggered in this manner instead of using one feeler of a width equal to that of the block, because a single feeler would not detect small spots of insulation on the surface of the block, as only that portion of the feeler touching the insulation would be separated from the block, the remainder of the solid feeler still being in contact therewith. As described hereinafter, the circuits associated with these feelers are so designed that if at any time during the operation of a test one or more of said feelers is separated from the surface of the block, the block will be rejected.

The block is held down against said feelers by a spring 210 which is mounted on the plate 211, said spring being sufficiently powerful to keep the bottom face of the block in contact with the test plate 169 against the tension of the spring feelers 204, 205, 206, and 207. Before passing under the spring 210, the block passes under a roller 212 attached to the end of a rod 213 pivoted and free to move about the screws 214' and 215. The rod 213 constitutes one terminal of a circuit controlling a safety device which controls the operation of the motor which drives the machine. Normally the roller 212 will not connect with the blocks as they pass under said roller in their travel from the chute 164 to a position under the spring 210 in the conductivity testing device. However, if for any reason the blocks are not properly placed on the bed plate or are in any other way out of proportion, so that they would injure the testing mechanism, they will make contact with the roller 212 before they reach said testing mechanism, and the operation of the machine as a whole will be stopped. The method of accomplishing this will be described more in detail hereinafter.

After the block has passed over the feelers 204, 205, 206, and 207 it is moved along on the test plate 169 between the retaining walls 208 and 209, over an electro-magnetically operated means 214 which functions to either accept or reject the block as a result of conditions established due to the test. This electro-magnetically operated gate 214 and its associated parts is illustrated in Figs. 9, 15, and 16 and consists of a relay 215, the armature 216 of which carries a forwardly extending rod 217 which is pivotally secured to a gate 218 pivotally mounted at 219. The armature 216 of the relay 215 is held in its normal position by a spiral spring 220 and when retained in this normal position, the rod 217 withdraws the gate 218 so that its horizontal shoulder will be out of the path of a carbon block which is being pushed past the gate by a pin 170 attached to the chain 171. When the gate is in this position the block will drop into the opening 222 in the test plate 169. However, when the relay 215 is energized the gate 218 is swung forward and the horizontal shoulder of the gate will support the block as it rides over the opening 222 and permit it to pass into the gaging mechanism.

As indicated in Figs. 9 and 16, the opening 222 in the test plate 169 is wider than the width of the block 223 which is being tested except for the shoulder 224 and the horizontal shoulder of the gate 218 when it is displaced into its actuated position. The shoulder 224 is provided to hold sound blocks in conjunction with the shoulder on the gate 218 and serves as a fulcrum about which defective blocks are turned and deposited endwise in a discharge tube 225 positioned under the opening 222 which leads to a suitable receptacle for defective blocks.

The further operation of the conductivity testing mechanism will now be explained in conjunction with the circuit diagram illustrated in Fig. 24. To simplify this diagram the feelers 204, 205, 206, and 207 have been shown separated from the test plate 169, it being understood, of course, that these feelers project through the test plate 169 and are insulated therefrom, making contact with the test block 226.

As indicated in the circuit, each of the test feelers is connected through a relay to battery, the feeler 204 being associated with the relay 227, the feeler 205 with the relay 228, the feeler 207 with the relay 229, and the feeler 206 with the relay 230. Each of these relays is equipped with an armature and make contact which are connected in a serial circuit with electromagnet 186 and battery. The electromagnet 186, as hereinbefore described in connection with the identification mechanism, controls the lever 177 and holds said lever in its horizontal position, as shown in the circuit, during the period that the block 226 is being tested by the feelers 204 to 207 inclusive if said block meets the conductivity requirements. Since it is necessary to maintain the electromagnet 186 energized during the entire period that the block 226 is under test, it follows that the relays 227 to 230 inclusive must likewise remain in their operated position during this period. However, since the feelers 204 to 207 inclusive are staggered, the block upon entering the test will first make contact with the feelers 204 and 205, during which period the feelers 206 and 207 will be out of circuit, and as the block leaves the test it will break contact with feelers 204 and 205 before the contact with the feelers 206 and 207 is broken. To compensate for this interval of time in the conductivity testing system the disk 202 and its associated mechanism is provided with the identification apparatus associated with said testing system.

This disk, as illustrated in Figs. 9 and 17, consists of a plurality of insulated segments such as 231 mounted in the periphery of the metallic disk 202. Contacting with that portion of the periphery of this disk in which the insulated segments are mounted are the springs 232 and 233; whereas the contact spring 234 makes contact with the remaining portion of the periphery and continually rides on the metallic surface of the disk 202. The disk 202 is attached to the shaft 174, and as said disk revolves, the contact springs 232 and 233 will alternately make contact with an insulated portion such as 231 and the metallic disk 202, while the contact spring 234 will always be in contact with the metallic disk 202. The insulated segments such as 231 are so placed in the disk 202 that the contact spring 233 will make contact with the disk 202 and will short-circuit the contacts of relays 229 and 230 for the short interval of time that the feelers 204 and 205 are in contact with the block 226 and the feelers 206 and 207 are not in contact with said block; and the contact spring 232 will serve to short-circuit the contact springs associated with the relays 228 and 227 during the short interval of time that the feelers 206 and 207 are in contact with the test block 226 and the feelers 204 and 205 are out of contact with said block.

When the block is pushed into the conductivity testing mechanism and makes contact with the feelers 204 and 205 a circuit is completed from the ground of the test plate 169, through the block 226, the feelers 204 and 205, and the relays 227 and 228 respectively to battery. At the same time that the feelers 204 and 205 make contact with the block 226 the disk 202 is rotated so that the contact 233 rides on the metallic periphery of the disk 202. A circuit is consequently completed which may be traced from battery through the electromagnet 186, the armature and make contact of relay 227, the armature and make contact of relay 228, the contact spring 234, the metallic disk 202, and the contact spring 233 to ground. The electromagnet 186 is consequently energized, and as the lever 177 associated with the block 226 is in its horizontal position, due to the action of the cam surface 184, and leaves said cam surface 184 at the time that the feelers 204 and 205 make contact with the block 226, the continued horizontal position of the lever 177 will be controlled by the electromagnet 186. As the block 226 is pushed along by the pin in the propelling chain 171, the feelers 206 and 207 likewise come in contact with the block surface and at the same time the contact spring 233 will leave the metallic portion of the disk 202 and ride on the surface of one of the insulated segments in its periphery. This will open the original energizing circuit of the electromagnet 186, but before this circuit is broken at the contact 233, the circuit will be completed, due to the completion of a circuit which may be traced from the ground of the test plate 169, through the block 226, the feelers 206 and 207, and the relays 230 and 229 respectively to battery. The operation of the relays 229 and 230 will close an energizing circuit for the electromagnet 186, which may be traced from battery, through said electromagnet, and the armatures and make contacts of the relays 227 to 230 inclusive in series to ground. The electromagnet 186 is consequently maintained in its energized condition and will hold the lever 177 in its horizontal position.

As the block continues in its travel along the test plate the contact between the feelers 204 and 205 is interrupted, but the energizing circuit of the relay 186 is not broken since that portion of the circuit including the armatures and make contacts of relays 227 and 228 is shunted by the contact springs 232 and 234, the disk 202 having been turned so that it contacts with the spring 232. As the block 226 leaves the feelers 206 and 207, the lever 177 will be moved under the shoulder of the disk segment 195 which will hold it in its horizontal position.

The block will now continue in its movement on the test plate 169 to the gate 218, and the lever 177 will be moved toward the contact spring 200. As the forward end of the block reaches the gate 218, the lever 177 will make contact with the spring 200 which will close a circuit which may be traced from battery, through the relay 215, the contact spring 200, and the lever 177 to ground. This will cause the operation of the relay 215 which will advance the gate and permit the block to slide over the opening 222 in the test plate to the gaging mechanism. Should the block 226 fail to meet the conductivity requirements, that is, if its bottom face contains any insulated spots which would raise the resistance of any of the circuits, including the feelers 204 to 207 inclusive, so that said resistance rises beyond a specified limit, then the relay associated with the particular feeler would be deënergized and hence the circuit of the electromagnet 186 would be interrupted. Immediately upon the interruption of said circuit, the lever associated with the test block will be deflected to its inclined position under the action of the spiral spring associated with said lever. The lever having assumed the inclined position cannot be drawn back to its horizontal position by the electromagnet 186, due to the excessive air gap between the lever and the coil, notwithstanding the fact that all the feelers 204 to 207 inclusive are again in good contact with the block 226, and the relays 227 to 230 inclusive are all energized. The lever 177 having once assumed its inclined position will rotate in this position past the disk segment 195 and will fail to make contact with the spring 200. Consequently the circuit of the relay 215 will not be completed, the gate 218 will remain in its open position and the block will drop through the opening 222 in the test plate into the discharge tube 225 which leads to a suitable receptacle for catching defective blocks.

All the blocks which successfully pass the conductivity test are next pushed by the pins in the chain 171 into the gaging test mechanism. This mechanism is illustrated in Figs. 9, 12, 13, and 14. The gaging mechanism consists of four feelers 235, 236, 237, and 238 respectively which constitute downwardly extending fingers of the levers 239, 240, 241, and 242 respectively which are pivoted at 243. The fingers 235 to 238 inclusive are mounted side by side and are of such a width that the entire ground surface of the block will be traversed by them. The levers 239 to 242 inclusive are pivoted so as to give a large transformation ratio, said ratio being approximately ten to one, the long arms of the levers moving in the guide bracket 243′ to facilitate the movement thereof which is controlled by the coiled springs 244, 245, 246, and 247 which function to pull said levers up against the contact and adjustment screws 248, 249, 250, and 251. The levers are consequently mounted so that a very slight movement of either one of the fingers 235 to 238 inclusive will be increased tenfold for that portion of the lever under the contact and adjustment screws 248 to 251 inclusive which reduces considerably the required delicacy of the contact adjustment.

Mounted directly beneath the levers and on the same perpendicular axis as the contact screws 248 to 251 inclusive are the contacts 252, 253, 254, and 255 which are mounted on the levers 256, 257, 258, and 259 pivoted at 260. These levers are fitted with triangular projections 261, 262, 263, and 264 which contact with the adjustment screws 265, 266, 267, and 268 respectively. The levers 256 to 259 are tensioned about the pivot 260 by coiled springs such as 269 so that the triangular projections 261 to 264 inclusive butt against the ends of the adjustment screws 265 to 268 inclusive.

With this lever arrangement when a block 270 is pushed beneath the fingers 235 to 238, the levers 239 to 242 inclusive will be turned about the pivot 243, and the end of the levers will be retracted from the contacts in the ends of the adjustment and contact screws 248 to 251. If the thickness of the block falls within the required maximum and minimum variation for thickness, the free ends of the levers should float between the contacts 252 to 255 inclusive and the contacts on the ends of the screws 248 to 251 inclusive. The maximum and minimum variations in the thickness of the block having been determined, the screws 248 to 251 inclusive and 265 to 268 inclusive can be readily adjusted so that the contacts coöperating with the levers will be so placed that the levers will not make contact therewith if the block falls within the specified dimensions. The screws 248 to 251 and the levers 256 to 259 inclusive are insulated from the frame of the machine and connected to battery. Coöperating with the gaging mechanism just described for the proper gaging of the blocks is an identification mechanism and an electromagnetically operated gate identical to that described for the conductivity testing mechanism with the exception that the identification system does not include the disk 202 and its associated mechanism.

Fig. 25 illustrates diagrammatically the circuits utilized in the operation of gaging. To simplify this diagram, but one lever and its associated contacts are shown, it being understood, however, that the contacts associated with all the levers are electrically connected, as indicated for the two contacts associated with the lever shown in the circuit diagram of Fig. 25. As indicated in this drawing, when the block 270 rides under the feeler of the lever it breaks the contact between the contact end of the lever and the upper contact spring and moves the contact end of the lever so it will float freely between the upper and lower contact springs. When in this position the relay 271 is de-energized. When the relay 271 is in its de-energized condition a circuit is closed which may be traced from battery, through the electromagnet 272, and the armature and break of the relay 271 to ground. The electromagnet 272 is consequently energized and will function to hold the lever 273 in its horizontal position while the block 270 is under test. As soon as the block 270 passes out from under the feelers, the lever 273 will ride under the shoulder of the disk segment 274 and will make contact with the spring 275 to operate the relay 276 and its associated gate 277 in a manner similar to that described in the operation of the conductivity testing system. However, if any portion of the block 270 falls below the prescribed maximum or above the minimum dimension, the lever will make contact with its upper or its lower contact spring, as the case may be, and the relay 271 will be energized by a circuit which may be traced from battery, through said relay, and thence through the contact spring and the lever to ground. The energization of the relay 271 will open the circuit of the electromagnet 272, and the lever 273 will assume its inclined position which it will retain during the remainder of the test. The relay 276 will consequently not be operated and the block will be rejected through the discharge tube 279' in a manner similar to that described in connection with the conductivity testing system.

All the blocks which survive the conductivity and gaging tests will be passed along to the surface testing mechanism. This mechanism is illustrated in Figs. 19, 20, and 21. The mechanism consists of an inverted runway 280 fitted with a plane surface 281, a plurality of levers 282, 283, 284, 285, and 286 which hold the block against the surface 281, and a plurality of feelers which constitute downwardly extending arms of the levers 287, 288, 289, and 290. The levers 282 to 286 inclusive are pivoted at 291, one end of each of said levers being connected to the spiral springs 292, 293, 294, 295, and 296 respectively, the other end of said levers being equipped with a plurality of semi-circular projections which protrude through an opening in the test plate 169, the height of these projections decreasing gradually on each lever in the direction of travel of the block, the height of corresponding projections on the various levers being equal. The levers 287 to 290 are pivoted at 297, one end of said levers carrying feelers such as 298 which project through the mounting plate 299 and the test plate 280, and the other end of said levers carrying the contacts 300, 301, 302, and 303. These contacts coöperate with the contact and adjustment screws 304, 305, 306, and 307, the levers being tensioned by spiral springs such as 298' so as to draw the contact ends of the lever against the ends of the screws 304 to 307 inclusive. Proper movement of the levers is facilitated by a guide bracket 308.

In testing the ground surface of the block said surface is pressed against the test surface 281 by the levers 282 to 286 inclusive as the block is pushed through the surface testing mechanism by the pin on the chain 171. The semi-circular projections on these levers are provided so that pressure will be applied only to the latter half of the block during this movement through the surface test mechanism, this being necessary so that the block will maintain the same relative position against the test surface 281 for the entire period of the test. This condition is obviously necessary so as to prevent a change in the position of the block while it is submitted to the test for it will be evident that if the block changes its position during the test fictitious results will be obtained.

As indicated in Fig. 21, the semi-circular projections on the levers 282 to 286 inclusive are arranged in three transverse oblique rows 310, 311, and 312 and, as shown in Fig. 20, the semi-circular projections of row 310 are slightly higher than the projections in row 311, and the projections in row 311 are slightly higher than those in row 312. Consequently when a block is pushed into the surfaces testing system the semi-circular projections in row 310 press the surface of the block against the surface 281, and the semi-circular projections in the other two rows have no effect on said block until the block has passed out of the control of the projections in the first row 310. The test feelers associated with the levers 287 to 290 inclusive are so positioned in the test surface 281 that the semi-circular projections in the first row 310 of the levers 282 to 286 inclusive will contact with the latter half of the block surface before the front end of the block reaches the position of the test feelers. When the block has been thus placed it has assumed a definite position with relation to the test plate 281 irrespective of the contour of the surface of the block under test, and the permanency of the positioned relationship between the block under test and the test surface 281 depends upon a holding pressure which is continually exerted upon the latter half of the block under test. This condition is readily accomplished by the levers 282 to 286 inclusive and their associated transverse rows of semi-circular projections 310 to 312 inclusive. Thus as the block under test rides under the test surface 281 its position with relation to the test surface is first controlled by the transverse row of projections 310. As the rear end of the block leaves the first one of these projections, the first projection in row 311 will make contact with the rear half of the surface of the block under test, and likewise as the rear end of the block successively passes out of the control of the other projections in the row 310, the control will be successively taken up by the projections in the row 310. In a similar way the pressure on the rear end of the block under test will be transferred from the projections in the row 310 to the projections in the row 312. Consequently after the first half of the block has been passed between the first row 310 of semi-circular projections and the test surface 281 it will be continually held against said surface by a pressure exerted on the rear half of the block, said pressure being exerted by the semi-circular projections in the levers 282 to 286 inclusive and said pressure being transferred from one projection to another as the block advances along the test surface and the latter half of the block under test passes out of the control of one of said circular projections and into the control of another. The relative position of the surface of the block under test to the test surface 281 after it has once been established is not changed during the entire period of the test, which condition is absolutely essential if correct results are to be obtained, and the use of the specific means herein illustrated and described or some equivalent means is, therefore, essential for the proper functioning of the surface testing system.

As the block is passed under the test surface 281 by the joint action of the pin 170 in the chain 171 and the semi-circular projections in the transverse rows 310 to 312 inclusive, the test feelers such as 298 associated with the levers 287 to 290 inclusive will test the ground surface of the block to determine whether the distance which intervenes between said test surface 281 and the ground surface of the block is greater than the allowable variation set by prescribed limits. If this distance is greater than allowable, the feeler or feelers, as the case may be, will trace this low surface which will establish circuit relations, by virtue of which the block will be rejected; whereas if the entire surface of the block falls within these prescribed limits, said circuits will be controlled to pass the block.

The circuits associated with the surface testing system are illustrated in Fig. 26. As here shown, a block 314 is being passed along the test surface 281 and has left all the semi-circular projections in the transverse row 310 and is being held against the test surface 281 by the projections in the transverse row 311. To simplify the drawing but one test feeler 298 is shown, it being understood, however, that each of the levers 287 to 290 is provided with one of these test feelers, the feelers extending across the entire surface of the block 314 which is under test. When the surface of the block 314 falls within the specified requirements, the feelers associated with the levers 287 to 290 inclusive are rotated about the pivot 297, and the contacts 300 to 303 inclusive are moved to a position in which they will not connect with the contact screws 304 to 307 inclusive. Under these conditions the circuits of the relays 315, 316, 317, and 318 will be open at contacts 300 to 303 respectively and consequently the armature of each of these relays will register with its break contact. A circuit will, therefore, be completed which may be traced from battery, through the electromagnet 320, the armature and make contact of relay 321, and the armatures and break contacts of the relays 316, 315, 317, and 318 in series to ground.

The relay 321 is a guard relay which is connected directly across the battery and is continually energized, provided the battery functions properly. Under these circumstances, therefore, its armature will connect with its make contact, and the circuit just traced, including the armatures and break contacts of the relays 316 to 318 inclusive, will be completed; and if at any time the battery fails to function properly the relay 321 will be deënergized and this will open said circuit and thereby prevent the passing of defective blocks because of battery trouble. This precaution is essential here because the apparatus controlling relays 316 to 318 inclusive in their normal position function to pass the block, and only when operated does the apparatus function to reject the blocks. In the other testing systems the apparatus operates in the reverse order and consequently no special means are required to prevent the passing of defective blocks due to battery trouble.

The completion of the circuit above traced, including the electromagnet 320, will energize said electromagnet, which will retain the lever 322 in its horizontal position and which will in turn operate a gate magnet 323 to move a gate 324 to its vertical position so that the block 314 which has successfully passed the test may be moved on to the counting mechanism.

In case the ground surface of the block 314 is concave or convex beyond the prescribed limits, or in any other way any portion of the ground surface of said block falls outside of said limits, the feeler testing that portion of the surface will be moved about the pivot 297 a distance sufficient to connect the contact associated with said lever and its associated contact screw. This will close a circuit from the ground on the lever by way of its associated contact and contact screw, through the associated relay 315, 316, 317, or 318, as the case may be, to battery. The selected relay will be energized and upon operating will open the circuit of the electromagnet 320 thereby causing the lever 322 to assume an inclined position wherefore the circuit of the relay 323 will not be closed, the gate 324 will not be operated, and the block will be rejected through the discharge tube 324', as fully described hereinbefore in connection with the gaging and conductivity testing systems.

When the blocks leave the surface testing system they will move along on the plate 169 past the counting mechanism or rollers, after which they are ejected through an opening in the plate 169 into a tube and from whence by means of a distributing means they are placed in cartons. The counting system functions to place a definite number, preferably 500, of the blocks in each carton, the cartons being placed at the end of a plurality of delivery tubes associated with the distributing mechanism illustrated in Fig. 22. A circuit of the counting mechanism is illustrated in Fig. 28 which shows a block 325 in contact with the counting rollers 326 and 327. As the block 325 is pushed along by the pin in the chain and comes in contact with the rollers 326 and 327 the following circuits are completed: first, a circuit which may be traced from the grounded plate 169, through the block 325, the roller 326, and the relay 328 to battery; and second, a circuit from the grounded plate 169 by way of the block 325, the roller 327, and the relay 329 to battery. The completion of these two circuits will energize the relays 328 and 329 which, by attracting their armatures, will close a circuit which may be traced from ground by way of the armature and make contact of relay 328 and the armature and make contact of relay 329, through the parallel branches containing the electromagnetic registering means 330 and 331 to battery. Each time this circuit is completed the electromagnetic registers 330 and 331 will be operated. The preferred register 330 is of the well-known type which through the armature actuated pawl 332 and the associated ratchet 333 will advance the circular disks 334, which are fitted with numerals on their peripheral surface, and which will consequently indicate the total number of blocks which have passed under the rollers 326 and 327.

The register 331 functions to control the distributing mechanism and is equipped with three disks 335, 336, and 337, each of which serve to actuate a pair of springs. These disks have been shown separated from the registering means with their associated springs to simplify the circuit diagram. The disks 335, 336, and 337 are interconnected by means of ratchets and pawls and to the electromagnet 331 in such a manner that the disk 335 will be rotated through a complete revolution for ten operations of the electromagnet 331; the disk 336 will be rotated through a complete revolution for each 100 operations of the electromagnet 331; and the disk 337 for each 1000 operations of the electromagnet 331. In the periphery of each of the disks 335 and 336 is a projection which rides under the contact springs 338 and 339 associated respectively with each of these disks, and the disk 337 is equipped with two such projections which ride under the contact spring 340 associated with this disk. The disks 335 and 336 are so mounted on the shaft that they are in alinement with one of the projections in the disk 337, and consequently the projection on the disk 335 and the projection on the disk 336 will raise their associated contact springs 338 and 339 respectively for each 100 actuations of the electromagnet 331, and the disks 335, 336, and 337 will raise their associated contact springs 338, 339, and 340 respectively, due to the projections on their periphery, once for every 500 operations of the electromagnet 331. The simultaneous raising of the springs 338, 339, and 340 will close a circuit which may be traced from battery, through the spring 338 and its associated make contact, the spring 339 and its associated make contact, the spring 340 and its associated make contact, and the electromagnet 341 to battery.

The electromagnet 341 controls the operation of the distributing system illustrated in Figs. 1 and 22. This distributing system consists of a tube 343 mounted beneath an opening in the plate 169 into which the blocks are ejected after they leave the rollers 326 and 327. The blocks will slide down this tube 343 into a connecting and selector tube 342. The connecting and selector tube 342 is mounted on a plate 344 and at a suitable angle with the horizontal so that the lower end thereof may be given a complete revolution of 360 degrees about an axis extending through the center of the plate 344 and the ends of the tubes 343 and 342. Connected to a dish plate 344 are a plurality of carton tubes such as 345 which are so mounted in the plate 344 that one extremity of said tubes will connect with the tube 342 as it is revolved about its axis and the other end with a carton such as 346 mounted beneath said tube. The plate 344 is equipped with twenty carton tubes, each of which terminates in a carton such as 346 which will conveniently hold 500 of the tested blocks.

The plate 344 and its associated mechanism is mounted beneath the test table by means of the brackets 347 and 348. Concentrically mounted on the plate 344 is the circular disk 350 containing twenty pins such as 351. These pins coöperate with the pawl 352 which is actuated by the armature of the electromagnet 341 through the rod 353 and the lever 354 pivoted at 355, one end of which is connected to the spring 356, the other end being movably connected to the pawl 352 by the screw 357. Consequently when the armature of the electromagnet 341 is attracted, the rod 353 will turn the lever 354 about its pivot 355 which will tension the spring 356 and likewise draw the pawl 352 out of engagement with its associated pin and cause it to connect with the next pin 351 in the disk 350. This movement of the lever 354 will also draw the retaining pawl 358 out of the line of movement of the pins 351. When the electromagnet 341 is deënergized, the pawl 352 will be returned to normal by the spring 356 and together with its associated pin will move the disk 350 forward through an arc of 18 degrees, and the lever 354 in moving forward will return the retaining pawl 358 to its normal position in front of one of the pins 351. The pawl 358 serves to prevent movement of the disk 350 in a counter-clockwise direction unless the pawl 352 is drawn away from its associated pin in the disk 350 by the armature of the electromagnet 341. A retaining pawl 359 pivoted at 360 prevents movement of the disk in a clockwise direction and retains the disk 350 in the position in which it is advanced by the pawl 352. Each operation of the electromagnet 341 will, therefore, advance the disk 350 through an angle of 18 degrees and this will move the selector tube 342 through the same angle. The carton tubes are distributed 18 degrees apart in the circular disk 344, and, therefore, each operation of the electromagnet 341 will move the selector tube from one carton tube to the next. Since the operation of the electromagnet 341 depends upon the relative position of the disks 335 to 337 inclusive and as the projections on these disks will be moved so as to close their associated springs simultaneously once for each 500 operations of the electromagnet 341, the selector tube 342 will be moved from one carton tube to the next when 500 blocks have been delivered to the carton tube from which it advances. The operation of the counting and distributing system is dependent upon the simultaneous connection to ground of the rollers 326 and 327. Two rollers are provided for this purpose to prevent erroneous counting which might result if either one of the rollers 326 or 327 should accidentally make contact with one of the pins 170 in the driving chain 171. The rollers 326 and 327 are so positioned that an empty pin cannot possibly make contact with both rollers, and the operation of the counting and distributing system is, therefore, dependent upon the passage of a block under the rollers 326 and 327.

To recapitulate, in counting and distributing the blocks, a block passes under the rollers 326 and 327 which causes the operation of the electromagnetic registers 330 and 331 which advances the counting and distributing disks associated with these electromagnets one step. After passing out from under the rollers a block falls through an opening in the plate 169 into the tube 343 and is carried by gravity through said tube and tube 342 and one of the carton tubes into a carton. After 500 blocks have thus been placed in one carton, the tube 342 is automatically advanced and the blocks are delivered to the next carton.

Fig. 23 is a diagrammatical illustration of the power distributing mechanism. The power is delivered to the shaft 360 where it is conveyed by means of a worm 361 and the worm wheel 362 to the shaft 363. The shaft 363 delivers its power by means of a pair of gears to the shaft 91, which shaft contains the sprocket wheels 365 and 366. Associated with the sprocket wheel 365 is an endless chain 367 which acts as an intermediate drive to drive the sprocket 368 mounted on the shaft 173, on which is also mounted the sprocket wheel 172 which drives the main test chain 171. The sprocket 366 is associated with an endless chain 369 which acts as an intermediate drive to drive the sprocket 370 which is mounted on the shaft 127 which also carries the sprocket 125 that drives the chain 123, on which are mounted the pins such as 129, which serve as a driving means for the blocks as they pass through the alloy testing mechanism. The cam 74 which reciprocates the rod 75 which controls the movement of the plate 73 is also mounted on the shaft 91. The shaft 91 through the agency of intermediate gearing also drives the shaft 375 on which is mounted the pulley 376 which is belted to a pulley mounted on the shaft 377 which also carries the pulley 70. The shaft 375 likewise carries a worm which meshes with a worm wheel mounted on the shaft 50 which carries a sprocket 378 which drives the endless chain 43 which carries the buckets of the conveyer mechanism.

The shaft 360 is preferably driven by a motor 379, the operation of which is suitably controlled by protective devices as illustrated in the circuit diagram shown in Fig. 29. The motor 379 is energized from a three-phase circuit in which are serially included the fuses 380 and the three-pole switch 381. With the switch 381 in its closed position the motor is started by closing the contacts of the push button switch 382. This closes a circuit which may be traced from the line wire 383 through its associated fuse and the blade of the switch 381 to and through the contacts of the switch 382, the coil 384 of a solenoid circuit breaker and another blade of the switch 381 and a fuse to the line wire 385. The closing of this circuit will energize the solenoid 384 which will attract its core and to which are attached the switch blades 386, 387, and 388, said blades, due to the movement of the core, closing the circuit of the three line wires 383, 385, and 389 to the three-phase motor 379, thereby starting said motor. The motor circuit will remain closed notwithstanding the subsequent interruption of the initial energizing circuit of the solenoid 384 at the contacts of the push button switch 382, since the circuit, through said solenoid, is closed through the switch blade 386, which circuit may be traced from the line wire 385 through its associated fuse and switch blade, through the solenoid 384, the break contact and armature of the relay 390, the switch blade 386 of the circuit breaker, a blade of the switch 381, and a fuse to the line 383. The continued operation of the motor 379 is now controlled by the switch 381 and the armature and break contact of the relay 390.

As hereinbefore described, the alloy testing mechanism is fitted with a guard spring 147, and the conductivity testing system with a guarding lever 212. These guarding devices are shown in the circuit diagram, Fig. 29, and function, as previously described, to open the circuit of the driving means—the motor 379—if a block becomes jammed in said testing mechanism. Thus if a block becomes jammed in the alloy testing system it will be raised so as to close a contact between the spring 147 and the test plate, which completes a circuit which may be traced from ground by way of the test plate and the jammed block, through the spring 147 and the relay 390 to battery. The relay 390 is, therefore, energized and will attract its armature, thereby interrupting the energizing circuit of the solenoid 384 of the circuit breaker which in turn will open the circuit of the motor 379 and thus stop the machine. In a similar way a block which is not properly positioned on entering the conductivity testing system will make contact with the roller 212 on the lever 213 which will likewise operate the relay 390 and cause the deënergization of the solenoid 384 and interrupt the power feed circuit of the motor 379. The key 391 functions in a similar manner and is mounted on the fore part of the test table to serve as a convenient means for the operator to stop the machine.

Associated with the chain 171 is a spring 392 on which is mounted a roller 393 which rides on said chain. The spring 392, as shown in Fig. 1, is mounted on an arm 394 depending from the lower surface of the test table, on which are also mounted the springs 395 and 396. The springs 392, 395, and 396 serve to close a circuit of the relay 390 which in turn opens the circuit of the solenoid 384 whenever for any reason trouble arises in the testing mechanisms mounted on the main test plate 169, whereby the slack in the chain 171 depending below said test plate is decreased. Whenever this slack is decreased the lever 392 through its associated roller 393 is carried forward, and in this movement it closes the contact between the springs 395 and 396. It will be evident that the protective devices just described in connection with Fig. 29 will guard the testing mechanisms in such a manner that if for any reason blocks are not properly introduced into said mechanisms the machine will be stopped and injury to any of the mechanisms will be avoided.

The operation of the complete machine may be briefly summarized as follows:

The blocks to be tested are first introduced into the hopper 39 from which they are conveyed a few at a time to the broken block and foreign material eliminating plate. They are pushed across this plate and are then introduced onto the belt conveyer 68 from which they are fed to the magazine 72. From the magazine 72 they are periodically fed into holders or pockets mounted on the disk 73, from which pockets they are periodically introduced into the alloy testing mechanism. The alloy testing mechanism functions to eliminate blocks in which the alloy is either missing, or fails to meet the specified conductivity requirements, or in which the alloy is not properly located in the block. All blocks which properly meet these requirements are delivered to the common test plate 169 with the alloy face of the block turned up. The blocks are then pushed across the plate 169 by means of pins in the chain 171 through the conductivity testing mechanism, the gaging mechanism the service testing mechanism, and finally under the counting mechanism and into the tube 343 leading to the distributing mechanism. Any blocks which do not meet the specified requirements as to conductivity, size, or surface are rejected immediately after they pass through the mechanism in which they failed to meet the test, and only sound blocks which have successfully passed through the various testing mechanisms are delivered to the counting rollers and the distributing tube 343. The sound blocks which are delivered to the distributing tube 343, as hereinbefore described, are delivered in lots of 500 to suitable cartons for packing purposes.

The method of testing carbon blocks as herein described is exceedingly efficient, since it not only overcomes the comparatively slow and tedious manual tests heretofore used but likewise overcomes the human equation necessarily introduced whenever a test is conducted manually. The present machine, therefore, not only tests the blocks much more rapidly but also performs this operation with unfailing accuracy. It is therefore much more reliable and also more economical. The machine operates at a substantial maximum efficiency at all times since the blocks are stored in the magazine 72 from which they are conveniently fed into the testing mechanisms regardless of the slight irregularities which naturally would occur in the picking up of blocks by the bucket conveyer.

Although the invention as herein described is applied to the testing of carbon blocks, it is not limited to this particular embodiment and many changes may be made therein without departing from the spirit and scope of the invention. Furthermore, it must be evident that other embodiments of the invention may be readily devised which will be applicable to the testing of articles other than carbon blocks, and the application of this invention is, therefore, not limited to the particular application herein described in detail, but is limited only by the spirit and scope of the appended claims.

What is claimed is:

1. A testing machine comprising, in combination, an article guiding mechanism, a test plate, a plurality of sets of contact springs associated with said test plate, an article propelling means, electro-magnetically operated means to determine the path of travel of said article, and an operating circuit for said electro-magnetically controlled means adapted to be completed through said article and one of said sets of contact springs depending upon the position of the article in the propelling means.

2. A testing machine comprising in combination, an article guiding mechanism, a test plate, a plurality of contact springs associated with said test plate, an article propelling means, a plurality of chutes, a second test plate, and electromagnetically controlled means operated to deflect said article into one of said chutes whereby said article is gravitationally conveyed on to said second test plate with a predetermined one of its faces in contact with said test plate, said electromagnetic means being controlled by said contacts.

3. A testing machine for protector blocks comprising in combination, a test plate, means operated to push said block across said test plate, a plurality of sets of contact springs associated with said plate which connect with the sides of said block as it is pushed across said test plate, and means controlled by a selected set of said contacts and said block operated to determine the subsequent travel of said block.

4. A testing machine for protector blocks comprising in combination, a test plate, a block propelling means, contact springs which connect with said block as it is propelled across said plate, a pair of electromagnets, and means controlled by said springs to operate one or the other of said magnets, depending upon the position of the side of the block which contains the fusible alloy.

5. A testing machine for protector blocks comprising in combination, a test plate, a block propelling means, contact springs which connect with said block as it is pushed across said plate, a plurality of chutes, and electromagnetically operated means controlled by said springs to deflect said blocks into one of said chutes, depending upon the position of said block on said test plate and the position and conductivity of the fusible alloy disk contained in one side of said block.

6. A testing machine for protector blocks comprising in combination, a test plate, a block propelling means, contact springs which connect with said block as it is pushed across said plate, and means associated with said springs operated to reject said block if the disk of fusible alloy is not properly centered in the top face of said block.

7. A testing machine for protector blocks comprising in combination, a test plate, a block propelling means, contact springs which connect with said block as it is propelled across said plate, a plurality of chutes, means associated with said springs operated to deflect said blocks into one of two of said chutes, depending upon the position of the side of the block containing the fusible alloy, means associated with said springs to deflect said block into a third chute if the disk of fusible alloy is not properly centered therein, and means associated with said springs to deflect said block into said third chute if the contact resistance between said springs and said disk of fusible alloy exceeds a certain specified amount.

8. In a testing system, the combination with a test plate, of means for propelling articles to be tested along said test plate, springs which contact with the surface of said article the contact of said springs being momentarily simultaneous when they contact with said surface near the opposite ends of said article, other contact springs, means operated by said other springs to detect the conductivity of an inlaid portion of said article, and means operated by said last-mentioned means which governs the direction of travel of said article.

9. In a testing system, the combination with a test plate, of means for propelling articles to be tested along said test plate, springs which contact with the surface of said article the contact of said springs being momentarily simultaneous when they contact with said surface near the opposite ends of said article, other contact springs, means controlled by all of said springs to detect the presence and position of an inlaid portion of said article, and means operated by said last-mentioned means which governs the direction of travel of said article.

10. In a testing system, the combination with a test plate, of means for propelling articles to be tested along said test plate, springs which contact with the surface of said article the contact of said springs being momentarily simultaneous when they contact with said surface near the opposite ends of said article, other contact springs, means controlled by all of said springs to detect the presence, position, and conductivity of an inlaid portion of said article, and means operated by said last-mentioned means which governs the direction of travel of said article.

11. In a testing system, the combination with a test plate, of means for propelling articles to be tested along said test plate, springs which contact with the surface of said article the contact of said springs being momentarily simultaneous when they contact with said surface near the opposite ends of said article, other contact springs, means coöperating with said other springs which will operate only when said springs contact with an inlaid portion of said article composed of material having an electrical conductivity greater than the conductivity of the material which constitutes the body portion of said article, and means operated by said last-mentioned means to govern the direction of travel of said article.

12. In a system for testing protector blocks, the combination with a test plate, of means whereby said block is pushed on one of its faces along said test plate, springs which contact with the opposite face of said block as it is pushed along said test plate and which are connected momentarily and simultaneously to said face when said springs contact with said face near opposite ends of said face, contact springs straddling said block as it moves along said test plate, and means controlled by said straddle springs to direct said block into one of three paths, depending upon the presence, position, and location of the disk of fusible alloy in said block.

13. In a system for testing protector blocks, the combination with a test plate, of means whereby said block is pushed on one of its faces along said test plate, springs which contact with the opposite face of said block as it is pushed along said test plate and which are connected momentarily and simultaneously to said face when said springs contact with said face near opposite ends of said face, contact springs straddling said block as it moves along said test plate, means controlled by said straddle springs to direct said block into one of three paths, depending upon the presence, position, and location of the disk of fusible alloy in said block, electromagnetic means controlled by said straddle springs depending upon the presence, position and location of the disk of fusible alloy in said block, means controlled by said electromagnetic means, and a plurality of gates which govern the direction of travel of said block, said last-mentioned means controlling the movement of said gates.

14. In a testing machine, the combination with a testing mechanism, of means operated to push articles to be tested through said mechanism, and means identified with said articles as they pass through said testing mechanism which serves to register defects in said articles which are tested by said mechanism.

15. In a testing machine, the combination with a testing mechanism, of means to push articles to be tested through said mechanism, means identified with each article as it is pushed through said mechanism which registers the result of said test, and means controlled by said identifying means operated to either accept or reject the article, depending upon the setting of the means identified with said article during the period of test.

16. In a testing machine, the combination with a testing mechanism, of means for continually propelling articles to be tested through said mechanism, means identified with each of said articles as they pass through said mechanism, and means controlled by said identifying means to either pass or reject the article after it leaves the testing mechanism, depending upon the result of said test.

17. In a testing machine, the combination with a testing mechanism, of a conveying means to push articles to be tested one after another in rapid succession through said mechanism, means identified with each of said articles as it passes through said mechanism which registers the results of the test, and means operated by the indentifying means associated with one of said articles to either pass or reject the same contemporaneous with the association of an identifying means with another article passing through said mechanism.

18. In a testing machine, the combination with a testing mechanism, of means operated to propel articles to be tested through said mechanism, means associated with said testing mechanism operated to reject or accept the article tested in said mechanism, depending upon the result of said test, a plurality of identifying means, one of which is associated with each article as it passes through said testing mechanism, and means operated by said identifying means which controls said rejecting and accepting means.

19. In a testing machine, the combination with a testing mechanism, of a conveying means for propelling articles to be tested through said mechanism, an identification apparatus associated with said testing mechanism and operated by said conveying means, said identification mechanism comprising a plurality of devices, one of which is associated with each block as it passes through said testing means and which serves to register the result of the test, and means operated to accept or reject the articles after they leave the testing mechanism, said means being controlled by said devices.

20. In a testing machine, the combination with a testing mechanism, of a conveying means for propelling articles through said testing mechanism, a rotatable disk associated with said testing mechanism and rotated by said conveying means, a plurality of pivoted arms mounted on said disk, said arms assuming a normal position inclined to the axis of said disk, mechanical means operated to move said arms into a position parallel to the axis of said disk, electromagnetic means operated to hold said arms in this position, the control of said arms being transferred to said electromagnetic means at the time an article is introduced into said testing mechanism, and said arms being identified with said article during the period of test, and means to control said electromagnetic means to hold said arm in said position during the period of test if said block successfully meets the test.

21. In a machine for testing the conductivity of the surface of an article, the combination with a test plate, of means for propelling the articles across said test plate, a yielding means for holding said articles against said test plate, and a plurality of springs operating to contact with the surface of the article to be tested, said springs being staggered across the surface of said article and in the direction of travel of said article.

22. In a device for testing the electrical conductivity of the surface of an article, the combination with a test plate, of a plurality of testing contacts projecting through said test plate, means operated to propel said surface along said test plate and over said contacts, and means operated to either accept or reject said surface depending upon the contact resistance between said surface and said contacts as the article is propelled along said test plate.

23. In a device for testing the electrical conductivity of the surface of an article, the combination with a test plate, of means to push said article along said test plate, and a plurality of test springs projecting through said test plate which connect with said surface and which are staggered longitudinally and transversely to the movement of said article.

24. In a device for testing the electrical conductivity of the surface of an article, the combination with a test plate, of means to push said article along said test plate, a plurality of test springs projecting through said test plate which connect with said surface as it is pushed along said plate, said test springs being staggered longitudinally and transversely, and means controlled by said test springs operated to either accept or reject said surface, depending upon the conductivity thereof.

25. In a device for testing the electrical conductivity of the surface of an article, the combination with a test plate, of means to push said surface along said test plate, means to test the electrical resistance of said surface as it moves along said test plate, and means which registers the result of said test and either accepts or rejects said article after it leaves said testing means.

26. In a system for testing the conductivity of the surface of an article, the combination with a test plate, of means for propelling the article along said test plate, a plurality of contact feelers contacting with the surface to be tested, means coöperating with each of said feelers, and means jointly controlled by said last-mentioned means to accept or reject said article, depending upon the conductivity of said surface.

27. In a testing system for testing the conductivity of the surface of an article, the combination with a test plate, means to propel the articles to be tested along said test plate, a plurality of feelers extending across the path of said article and connecting with said surface, electromagnetic means associated with each of said feelers normally operated when the surface that is being tested conforms to the specified test requirements, and means jointly controlled by said electromagnetic means to either accept or reject the article, depending upon the conductive relationship between said feelers and the surface being tested.

28. In a testing system for testing the conductivity of articles, the combination with a test plate, of means for pushing the articles along said test plate, a plurality of feelers contacting with said surface, a relay associated with each of said feelers, said relays being operated when said surface conforms to the conductivity test requirements, means operated to control the acceptance or rejection of said article depending upon said test, and a serial circuit controlling said last-mentioned means, said circuit being jointly controlled by said relays.

29. In a system for testing the conductivity of the surface of an article, the combination with a test plate, of means for pushing the article along said test plate, a plurality of feelers contacting with said surface, said feelers being staggered longitudinally and transversely to the direction of movement of said article, a relay associated with each one of said feelers, electromagnetic means controlling the acceptance or rejection of said article depending upon the continued energization of said electromagnetic means, and means operated to maintain said electromagnetic means continually energized, said last-mentioned means being released by any one of said relays when the feeler associated with said relay registers with a part of the surface of said article having a surface resistance greater that that set by prescribed limits.

30. In a system for testing the conductivity of the surface of an article, the combination with a test plate, of means for propelling the article along said test plate, a plurality of feelers which test the conductivity of said surface as it is propelled along said test plate, electromagnetic means operated as long as said surface meets the conductivity test requirements, and means associated with each of said feelers to interrupt said continued operation when said surface fails to meet the specified conductivity limits set for the test.

31. In a system for testing the conductivity of the surface of an article, the combination with a test plate, of means for pushing the article along said test plate, a plurality of feelers contacting with said surface, said feelers being staggered longitudinally and transversely to the direction of movement of said article, a relay associated with each one of said feelers, contact springs controlled by each one of said relays, an electromagnet, a serial circuit including said electromagnet completed by the simultaneous operation of the contact springs of all of said relays, shunting means operated to parallel the spring contacts of the relays associated with the longitudinally staggered feelers which do not connect with the article when it moves into contact with the foremost of said feelers, means operated to open the shunting means as these feelers connect with said article, shunting means operated to parallel the contacts of the relays associated with the longitudinally staggered feelers which first sever connection with said article, means operated to open this shunting means when all of the feelers sever contact with said article, and means operated to reject said article which is controlled by said electromagnet and operated when one of said feelers contacts with a portion of the surface of an article having a surface resistance greater than that set by prescribed limits.

32. In a testing mechanism for gaging the dimension of articles, the combination with a test plate, of means for propelling the articles across said test plate, yielding means operated to contact with the top surface of said articles as they move across said test plate, and means controlled by said yielding means to pass or reject said articles after they pass through said testing mechanism depending upon the result of said test.

33. In a testing mechanism for gaging the dimensions of articles, the combination with a test plate, of means for propelling the articles across said test plate, a plurality of levers, a plurality of test fingers integral with said levers which contact with the top surface of said articles as they are moved along said test plate, and means operated to either pass or reject said articles after they leave said test fingers.

34. In a testing machine for gaging the dimensions of articles, the combination with a test plate, of means for propelling the articles across said test plate, a plurality of levers, test fingers integral with one end of each of said levers which contact with the top surface of said articles as they travel along said test plate, contact members cooperating with the other end of said levers, and means whereby said levers connect with said contact members if said articles fail to meet the specified dimensions.

35. In a testing machine for gaging the dimensions of articles, the combination with a test plate, of means for propelling the articles across said test plate, a plurality of levers, test fingers integral with one end of each of said levers which contact with the top surface of said articles as they travel along said test plate, contact members positioned above and below the other end of each of said levers, and means whereby said levers will float between said contacts if said articles fall within the specified maximum and minimum variations.

36. In a testing machine for gaging the dimensions of articles, the combination with a test plate, of means for propelling the articles across said test plate, a plurality of test fingers which contact with the surface of said articles as they move along said test plate, and means controlled by said test fingers operated to either accept or reject said articles after they are moved out of contact with said test fingers.

37. In a testing system for gaging the dimensions of articles, the combination with a test plate, of means for pushing the articles along said test plate, a plurality of feelers engaging said article as it moves along said test plate, and means continually operated to pass said article if it falls within the specified maximum and minimum dimension variations.

38. In a system for gaging the dimensions of articles, the combination with a test plate, of means for pushing the article along said test plate, a plurality of feelers contacting with said article as it moves along said test plate, a relay, means operated to energize said relay if any of said feelers register with a part of said article which falls outside the specified maximum or minimum dimension variation, an electromagnet which is continually energized if the article tested falls within the specified maximum and minimum variations to pass said article, and means operated by said relay to deënergize said electromagnet whereby said article will be rejected if it fails to meet the specified dimension requirements.

39. In a testing system for gaging the dimensions of articles, the combination with a test plate, of means for propelling the articles across the test plate, means operated to contact with the top surface of said articles as they are moved along said test plate, a relay, and means cooperating with said first-mentioned means to operate said relay if the articles fail to meet the specified dimensions, whereby said articles will be rejected.

40. In a testing system for gaging the dimensions of articles, the combination with a test plate, of means for propelling the articles along said test plate, means operated to contact with the top surface of said articles as they are moved along said test plate, a relay, means coöperating with said first-mentioned means to operate said relay if the article fails to meet the specified dimensions, and means actuated by the operation of said relay to register a defective article and reject said article after it leaves said first-mentioned means.

41. In a testing system for gaging the dimensions of articles, the combination with a test plate, of means for propelling the articles along said test plate, a plurality of testing levers, test fingers associated with said levers which contact with the top surface of said articles as they move along said test plate, a plurality of contacts associated with each said lever, a relay common to all of said contacts, means whereby any lever and one of its associated contacts is electrically connected if the test finger associated with said lever contacts with a part of said article which measures above or below the prescribed dimensions, thereby operating said relay, and means controlled by said relay to thereupon reject said article.

42. In a testing mechanism for determining the degree of perfection of the plane surface of an article, the combination with a plane testing surface, of means for holding the surface to be tested against said testing surface, means to push said article along said testing surface, and means operated to register the distance intervening between said surfaces.

43. In a testing mechanism for determining the degree of perfection of the plane surface of an article, the combination with a plane testing surface, of means for holding the surface to be tested against said testing surface and whereby the relative position of the testing surface and the surface to be tested is established prior to the beginning of the test and said position maintained during the period of said test, means whereby the article is pushed along said testing surface, and means operated to register the distance intervening between said surfaces.

44. In a testing mechanism for determining the degree of perfection of the plane surface of an article, the combination with a plane testing surface, of means for holding the surface to be tested against said testing surface, means to push said article along said testing surface, means operated to register the distance intervening between said surfaces, and means controlled by said last-mentioned means to either accept or reject said article depending upon said test after said article passes beyond said testing surfaces.

45. In a testing mechanism for determining the degree of perfection of the plane surface of an article, the combination with a plane testing surface, of means for holding the surface to be tested against said testing surface whereby the relative position of the testing surface and the surface to be tested is established prior to the starting of the test and said position maintained during the period of said test, means whereby the article is pushed along said testing surface, means operated to register the distance intervening between said surfaces, and means controlled by said last-mentioned means to either accept or reject said article.

46. In a testing mechanism for testing plane surfaces, the combination with a test plate, means to push articles along said test plate, a plane testing surface, means to apply pressure to said articles whereby the surface to be tested will maintain the same relative position to the testing surface for the entire period of the test, and a plurality of feelers which trace the contour of the surface to be tested said feelers registering the distance intervening between said surface and the testing surface.

47. In a testing mechanism for testing plane surfaces, the combination with a test plate, of means to push articles along said test plate, a plane testing surface, means to apply pressure to said articles whereby the surface to be tested will maintain the same relative position to the testing surface for the entire period of the test, a plurality of feelers arranged across the path of the surface to be tested and operated to trace the contour of said surface said feelers registering the distance intervening between said surface and the testing surface, and means controlled by each one of said feelers to either reject or accept said article depending upon the movement of said feelers.

48. In a testing mechanism for testing the plane surfaces of an article, the combination with a test plate, of means to push the articles along said test plate, a plane testing surface, and means to apply a holding pressure to said articles which is continually exerted upon the latter half of the article whereby the positioned relationship between the surface under test and the testing surface is maintained permanent during the period of the test.

49. In a testing mechanism for testing the plane surface of an article, the combination with a test plate, means to push said article along said test plate, a plane testing surface, a plurality of levers each fitted with a series of projections which protrude through said test plate, which decrease in height in the direction of movement of said article and which are arranged in transverse oblique rows across the path of said article, and means to control said levers whereby a holding pressure will be applied to said article which will force it against said testing surface and which is continually exerted upon the latter half of said article.

50. In a testing device for determining the degree of perfection of the plane surface of an article, the combination with a test plate, means to push the article along said test plate, a plane testing surface, means operated to force the surface to be tested against said testing surface, a plurality of feelers which protrude through said testing surface and across the path of said article and which trace the contour of said article, and means associated with said feelers operated to reject said article if the space intervening between said surfaces is greater than the allowable variation set up by prescribed limits.

51. In a testing system for testing plane surfaces, the combination with a test plate, means to push articles along said test plate, a plane testing surface, means to apply pressure to said articles whereby the surface to be tested will maintain the same relative position to the testing surface for the entire period of the test, a plurality of feelers which trace the contour of the surface to be tested, said feelers registering the distance intervening between said surface and the testing surface, a plurality of relays, one associated with each of said feelers, means actuated to operate the relay associated with any one of said feelers if the space intervening between the surface to be tested and the testing surface exceeds a prescribed maximum, and means controlled by any one of said operated relays to reject the article tested.

52. In a testing mechanism for determining the degree of perfection of the plane surface of an article, the combination with a plane testing surface, of means for holding the surface to be tested against said testing surface, means to push said article along said testing surface, a plurality of levers operated to register the distance intervening between said surfaces, a plurality of relays, one associated with each of said levers, an electromagnet, means controlled by said magnet to either pass or reject the articles tested, a serial circuit including said electromagnet the continuity of which is controlled by each of said relays, and means coöperating with said levers to operate the relay associated with a lever which registers a distance greater than the specified maximum, whereby the circuit of said electromagnet is interrupted and the article rejected.

53. In a testing machine, the combination with a test plate, of a plurality of testing mechanisms, contact members, means to propel articles to be tested along said test plate and through said testing mechanisms and under said contact members, a relay associated with each one of said contact members, a distributing magnet operated upon the joint operation of said relays, an article receiving device, a controlling magnet, and means operated by said distributing magnet to periodically operate said controlling magnet to advance said receiving device.

54. In a testing machine, the combination with a test plate, of a plurality of testing mechanisms mounted on said test plate, means to propel the articles to be tested along said test plate and through said testing mechanisms, a plurality of receiving devices situated beneath openings in said test plate one of said devices being associated with each mechanism, and means coöperating with each mechanism whereby the article will fall through the opening and into the receptacle associated with said mechanism if said article does not pass the test and whereby the article will pass over said opening and continue in its travel along said test plate if it passes the test.

55. In a testing machine, the combination with a test plate, of a testing mechanism associated with said plate, means operated to push articles to be tested along said plate and through said mechanism, means associated with said mechanism into which the articles are gravitationally transferred if they fail to meet the test, and means operated when the article passes the test which prevents said transfer and whereby the articles continue in their travel along said test plate.

56. In a machine for testing rectangular articles, the combination with a hopper in which said articles are promiscuously stored, of conveying means, means coöperating with said conveying means for selecting the sound articles, a magazine to which said sound articles are conveyed from said last-mentioned means, a main test plate, means operated to project said articles from said magazine to said main test plate in a definite position and on the same face of the article, a conductivity testing mechanism, a gaging mechanism and a surface testing mechanism associated with said test plate, means operated to push said articles along said test plate through said testing mechanisms, and means coöperating with each of said testing mechanisms to either accept or reject each article as it leaves each of said testing mechanisms.

57. In a testing system, the combination with testing mechanisms, of a test plate associated with said testing mechanisms, means for propelling articles to be tested through said testing mechanisms, a relay, a contact member arranged to contact with an article that is improperly lodged on said test plate just prior to its entry into said testing mechanisms thereby operating said relay, and means controlled by said relay to thereupon stop said propelling means.

58. The process of testing the conductivity of articles, which consists in passing said articles one at a time between a plurality of contacts and deflecting them into one of three paths depending upon the operation of a plurality of relays controlled by said contacts.

59. The process of arranging articles in the same relative order on a test plate for testing purposes, which consists in passing said articles one at a time between a plurality of contacts and then guiding them into one of a plurality of chutes selected by relays controlled by said contacts, the operation of said relays depending upon the relative position and conductivity of the materials constituting said articles.

60. The process of testing the conductivity of the surface of an article, which consists in passing said article periodically one at a time along a test plate and over a plurality of contacting feelers, registering any failure of the conductivity as measured by said feelers to come within a certain prescribed minimum conductivity, and finally passing or rejecting the articles after they are moved out of contact with said feelers depending upon said registration.

61. The process of gaging the dimensions of an article, which consists in periodically propelling the article along a plate and under a plurality of gaging feelers, registering any dimensions as measured by said feelers which fails to come within a specified maximum and minimum dimension variation, and finally passing or rejecting the article after it is moved out of contact with said feelers depending upon said registration.

62. The process of testing the plane surface of an article, which consists in establishing a permanent positioned relationship between the surface and a testing surface, then propelling the article along said testing surface and measuring at a fixed place in the testing surface the space intervening between said surfaces.

63. The process of testing the plane surface of an article, which consists in establishing a permanent positioned relationship between the surface and a testing surface, then propelling the article along said testing surface and measuring at a fixed place in the testing surface the space intervening between said surfaces, then registering a failure to maintain the space between said surfaces below a prescribed maximum, and finally passing or rejecting the article after it is moved beyond said plane testing surface depending upon said registration.

64. The process of testing articles, which consists in periodically propelling the articles along a plate one after another through a testing mechanism, and identifying a registering means with each of said articles as they pass through said mechanism to record defects therein and which controls the ultimate acceptance or rejection of the articles after they leave said testing mechanism.

In witness whereof I hereunto subscribe my name this nineteenth day of December, A. D. 1916.

ALLEN B. HAZARD.